(12) United States Patent
Shimazawa et al.

(10) Patent No.: US 8,194,509 B2
(45) Date of Patent: Jun. 5, 2012

(54) THERMALLY-ASSISTED MAGNETIC RECORDING HEAD COMPRISING LIGHT SOURCE WITH PHOTONIC-BAND LAYER

(75) Inventors: Koji Shimazawa, Tokyo (JP); Seiichi Takayama, Tokyo (JP); Tsutomu Chou, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 357 days.

(21) Appl. No.: 12/512,249

(22) Filed: Jul. 30, 2009

(65) Prior Publication Data
US 2011/0026377 A1  Feb. 3, 2011

(51) Int. Cl.
*G11B 11/00* (2006.01)
(52) U.S. Cl. .................. 369/13.33; 369/13.13
(58) Field of Classification Search ............ 369/13.33, 369/13.13, 13.32, 112.09, 112.14, 112.21, 369/112.27; 360/59; 385/129, 31, 88–94; 250/201.3, 201.5
See application file for complete search history.

(56) References Cited

U.S. PATENT DOCUMENTS

| | | | |
|---|---|---|---|
| 5,946,281 A | 8/1999 | Ito et al. | |
| 6,567,373 B1 | 5/2003 | Kato et al. | |
| 6,711,200 B1 | 3/2004 | Scherer et al. | |
| 6,795,380 B2 | 9/2004 | Akiyama et al. | |
| 6,944,112 B2 | 9/2005 | Challener | |
| 7,330,404 B2 | 2/2008 | Peng et al. | |
| 7,454,095 B2 | 11/2008 | Baehr-Jones et al. | |
| 7,729,085 B2 * | 6/2010 | Jin et al. | 369/13.13 |
| 7,911,883 B2 * | 3/2011 | Sasaki et al. | 369/13.33 |
| 2005/0213436 A1 | 9/2005 | Ono et al. | |
| 2006/0187564 A1 | 8/2006 | Sato et al. | |
| 2008/0002298 A1 | 1/2008 | Sluzewski | |
| 2008/0056073 A1 | 3/2008 | Shimizu | |
| 2008/0179606 A1 | 7/2008 | Usuda et al. | |

(Continued)

FOREIGN PATENT DOCUMENTS
JP  2007-073945  3/2007
(Continued)

OTHER PUBLICATIONS

Kyosuke Sakai, et al., "Lasing Band-Edge Identification for a Surface-Emitting Photonic Crystal Laser", IEEE Journal on Selected Areas in Communications, vol. 23, No. 7, Jul. 2005, pp. 1335-1340.

(Continued)

*Primary Examiner* — Tan X Dinh
(74) *Attorney, Agent, or Firm* — Frommer Lawrence & Haug LLP

(57) ABSTRACT

A thermally-assisted magnetic recording head is provided, in which a light source having sufficiently high output power for performing thermal-assist is disposed in the element-integration surface of the substrate to achieve improved mass-productivity. The head includes: a light source having a multi-layered structure including a photonic-band layer and having a light-emitting surface opposed to the element-integration surface; a diffraction optical element that converges the emitted light; a light-path changer that changes the direction of the converged light; a waveguide that propagates the direction-changed light toward the opposed-to-medium surface; and a magnetic pole that generates write field. The surface-emitting type light source includes a photonic-band layer having a periodic structure in which a light from an active region resonates, and thus emits laser light on a quite different principle from a VCSEL. Therefore, the light source can be disposed in the element-integration surface, even though having sufficiently high output power.

23 Claims, 11 Drawing Sheets

U.S. PATENT DOCUMENTS

| | | |
|---|---|---|
| 2008/0204916 A1 | 8/2008 | Matsumoto et al. |
| 2010/0195238 A1* | 8/2010 | Shimazawa et al. ........ 369/13.33 |
| 2010/0195239 A1* | 8/2010 | Takayama et al. .......... 369/13.33 |
| 2010/0202081 A1* | 8/2010 | Shimazawa et al. ........ 369/13.33 |
| 2011/0090587 A1* | 4/2011 | Chou et al. ................. 369/13.33 |
| 2011/0122737 A1* | 5/2011 | Shimazawa et al. ........ 369/13.33 |

FOREIGN PATENT DOCUMENTS

| | | |
|---|---|---|
| JP | 2007-200475 | 8/2007 |
| JP | 2008-182110 | 8/2008 |
| JP | 2008-204586 | 9/2008 |
| JP | 2009-111167 | 5/2009 |

OTHER PUBLICATIONS

Michael Hochberg, et al., "Integrated Plasmon and Dielectric Waveguides", Optics Express, vol. 12, No. 22, Nov. 2004, pp. 5481-5486.

Robert E. Rottmayer, et al., "Heat-Assisted Magnetic Recording", IEEE Transactions on Magnetics, vol. 42, No. 10, Oct. 2006, pp. 2417-2421.

* cited by examiner

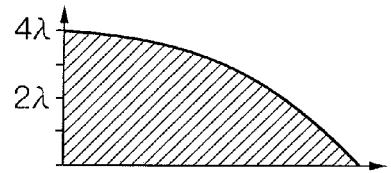
Fig. 5a1
Fig. 5a2
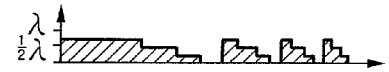
Fig. 5a3
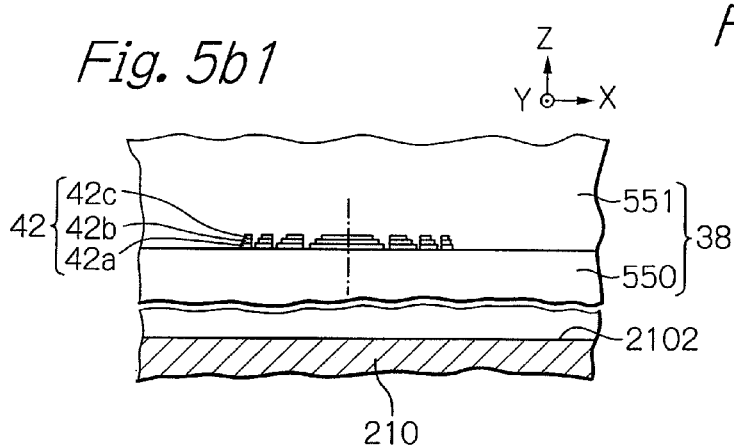
Fig. 5b1
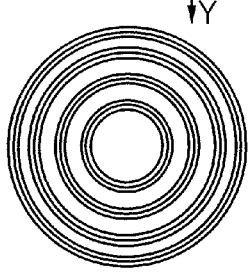
Fig. 5b2
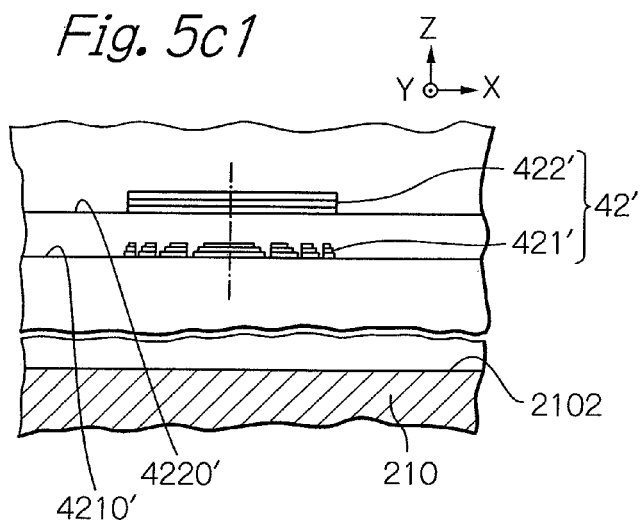
Fig. 5c1
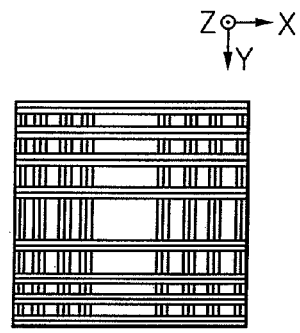
Fig. 5c2

THERMALLY-ASSISTED MAGNETIC RECORDING HEAD COMPRISING LIGHT SOURCE WITH PHOTONIC-BAND LAYER

BACKGROUND OF THE INVENTION

1. Field of the Invention

The present invention relates to a magnetic recording head used for thermally-assisted magnetic recording in which a magnetic recording medium is irradiated with light, thereby anisotropic magnetic field of the medium is lowered, thus data can be written. Further, the present invention relates to a head gimbal assembly (HGA) provided with the head, and to a magnetic recording apparatus provided with the HGA.

2. Description of the Related Art

As the recording density of a magnetic recording apparatus, as represented by a magnetic disk apparatus, becomes higher, further improvement has been required in the performance of a thin-film magnetic head and a magnetic recording medium. Especially, in the magnetic recording medium, it is necessary to decrease the size of magnetic microparticles that constitute the magnetic recording layer of the medium, and to reduce irregularity in the boundary of record bit in order to improve the recording density. However, the decrease in size of the magnetic microparticles raises a problem of degradation in thermal stability of the magnetization due to the decrease in volume. As a measure against the thermal stability problem, it may be possible to increase the magnetic anisotropy energy $K_U$ of the magnetic microparticles. However, the increase in energy $K_U$ causes the increase in anisotropic magnetic field (coercive force) of the magnetic recording medium. As a result, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion.

In this thermally-assisted magnetic recording technique, there has been generally used a method in which a magnetic recording medium is irradiated and thus heated with a light such as near-field light. In this case, it is important to form a very minute light spot at a desired position on the magnetic recording medium. However, from the beginning, more significant problem to be solved exists in how the light is to be supplied from a light source to the inside of a head, and specifically, where and how the light source is to be disposed.

As for the supplying of light, for example, U.S. Pat. Nos. 6,567,373 B1, 6,795,380 B2 and Japanese Patent Publication No. 2007-200475A disclose a structure in which light is guided to a desired position by using an optical fiber and a reflection means. Further, US Patent Publication No. 2006/0187564 A1 discloses a structure in which a unit having a heatsink and a laser diode is mounted on the back surface of a slider. And US Patent Publication No. 2008/0056073 A1 discloses that a structure, in which a reflection mirror is monolithically integrated into a laser diode element, is mounted on the back surface of a slider. Further, US Patent Publication No. 2005/0213436 A1 discloses a slider structure that is integrated with a semiconductor laser. And Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with the light emitted from a laser unit provided within a drive apparatus.

Furthermore, US Patent Publication No. 2008/0002298 A1 and U.S. Pat. No. 5,946,281 A disclose heads in which a light source is disposed in an element-integration surface of a slider substrate. In these heads, a surface-emitting laser diode, which is easily disposed in the element-integration surface, is used as a light source, and laser light from the surface-emitting laser diode is guided to a desired position by using a diffraction grating. Conventionally, optical devices, such as a reflection mirror, an optical fiber and a laser diode, have been mounted after a polishing operation in the wafer process of the head manufacturing. On the contrary, in these heads, by forming an optical system in the wafer process and further providing the surface-emitting laser diode in the element-integration surface also in the wafer process, the construction of the optical system is completed in the stage of the wafer process, which makes this construction comparatively facilitated and simplified and allows improvement of mass-productivity.

However, the surface-emitting laser diode used in these documents is a vertical-cavity surface-emitting laser (VCSEL) that is widely used. In a magnetic recording head in which such a surface-emitting laser diode and the diffraction grating are disposed in the element-integration surface as described above, an insufficient laser output power in the surface-emitting laser diode and the degradation in function of the diffraction grating due to fluctuation of the wavelength of the laser light are likely to lead to serious problems.

First, as for the insufficient laser output power, the amount of output of near-field light, required for attaining a recording density exceeding 1 Tbits/in$^2$ in a magnetic disk apparatus for performing the thermally-assisted magnetic recording with use of near-field light, has been approximately 1 mW with a spot diameter of 40 nm or less, according to the estimation by the present inventors using simulation and the like. Moreover, the light use efficiency, which the present inventors estimated for the overall optical system in an expected head structure, has been approximately 2%. Therefore, the output power necessary for the laser diode as a light source is estimated to be 50 mW or more. However, a VCSEL generally has a short cavity length, and the output power is about several mW for general use. Therefore, it is difficult for the use of the VCSEL to meet such a high output power.

Next, as for the degradation in function of the diffraction grating due to fluctuation of the wavelength of the laser light, a diffraction grating has a function of changing a propagation direction of the light. This function is achieved by using a grating having a distance and arrangement designed based on the wavelength of incident light, and is significantly affected by the wavelength of the incident light. Here, since the laser diode mounted on a head is a device formed of a semiconductor material, its wavelength changes according to the change of surrounding temperature. Specifically, the assumed temperature in the environment where a magnetic disk apparatus is used is, for example, about −5 to 60° C. (degrees centigrade), and accordingly the wavelength may vary, for example, in the range of approximately from 5 to 10 nm. Therefore, when such a diffraction grating is used, a serious problem may occur such that the function of the diffraction grating is degraded by the wavelength fluctuation and then the laser light may not reach a desired position.

Furthermore, in a VCSEL, the size of the beam spot near the light-emitting surface is extremely small, for example, approximately 0.5 to 5.0 µm. And the divergence angle of the emitted laser light is rather large. Therefore, for example, it may become difficult to monitor the output of the light emitted from the VCSEL in order to adjust the output. Actually, for monitoring the light output of the VCSEL, a part of the laser light emitted from the VCSEL is taken out, then the part of the laser light is detected by a light detector provided also in the element-integration surface. In the case, in order to avoid greater loss in the amount of light used for the thermal assist, the part of the laser light should not be taken out by using a reflecting mirror or the like until the emitted laser light is diverged to a considerable degree. Therefore, the reflecting mirror or the like has no other choice to be provided in a position far away from the light-emitting surface of the VCSEL toward the element-integration surface. As a result, the light-path length from the VCSEL to the light detector increases, which may cause greater light loss and prevent satisfactory detection. Primarily, the considerably large divergence angle of the laser light emitted from the VCSEL has caused a difficulty in transforming the diverged laser light into a light beam with a minute spot size within the head.

SUMMARY OF THE INVENTION

Some terms used in the specification will be defined before explaining the present invention. In a layered structure or an element structure formed in the element-integration surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a thermally-assisted magnetic recording head is provided, which comprises:

a light source provided in an element-integration surface of a substrate, and having a multilayered structure including a photonic-band layer having a periodic structure in which a light generated from an active region resonates, and the light source having a light-emitting surface that is a layer surface as an end surface of the multilayered structure and is opposed to the element-integration surface;

a diffraction optical element that converges a light emitted from the light-emitting surface;

a light-path changer that changes a propagation direction of the converged light;

a waveguide that propagates the light, whose propagation direction is changed by the light-path changer, toward an opposed-to-medium surface; and a magnetic pole that generates write field from its end surface on the opposed-to-medium surface side, provided in the element-integration surface of the substrate.

The light source according to the present invention has a multilayered structure including a photonic-band layer, and thus is a laser diode of surface-emitting type that emits laser light on a quite different principle from that of a vertical-cavity surface-emitting laser (VCSEL). Therefore, the light source can be disposed in the element-integration surface of the slider substrate to achieve improvement of mass-productivity, even though the light source has a sufficiently high output power for performing thermal assist. As a result, according to the present invention, there is provided a thermally-assisted magnetic recording head in which a light source having a sufficiently high output power is disposed in the element-integration surface of the slider substrate to achieve improvement of mass-productivity.

It the thermally-assisted magnetic recording head according to the present invention, preferably further provided is a spot-size converter that converts a spot size of the light whose propagation direction is changed by the light-path changer. Here, a spot diameter of a light that is entering the spot-size converter is preferably in a range of 2-20 times larger than a spot diameter of the light that has just entered the waveguide, and is also preferably 1 μm (micrometer) or more, and is 10 μm or less. The spot-size converter plays an important role when a light source having a sufficiently large spot diameter of the emitted beam is used to obtain higher output power. The above-described diffraction optical element is preferably a binary lens. In the case, it is preferable that a two-dimensional periodic plane of the periodic structure that the photonic-band layer has and a lens plane perpendicular to an optical axis of the diffraction optical element are parallel to the element-integration surface of the substrate. Further, the light-path changer is preferably a reflecting mirror that reflects the converged light. Here, the combination of the binary lens and the reflecting mirror is an optical system that is hardly affected adversely by the change of surrounding temperature, compared with a diffraction grating. Alternatively, a prism can be used as a light-path changer.

By structuring the optical system within the head as described above, a light source having a sufficiently high output power can be disposed in the element-integration surface of the slider substrate to achieve improvement of mass-productivity: and based on that, it becomes possible to guide light efficiently into a desired position on the opposed-to-medium surface side without being hardly affected adversely by the change of surrounding temperature.

Furthermore, the thermally-assisted magnetic recording head according to the present invention preferably further comprises: a light detector that measures an output power of the light source in order to adjust the output power; and at least one detective light-path changer that directs a part of light propagating between the light-emitting surface of the light source and the diffraction optical element toward the light detector. Here, the light source provided within the head according to the present invention can emit a light that is suitable for transforming the light into a light beam with a minute spot size, or is suitable for monitoring the output power of the light, that is, the light source can emit a collimated light with a minute divergence angle. Therefore, by monitoring the light output power of the light source, it becomes possible to suppress the variation due to temperature change and further over time in the light output power, thereby there can be ensured the appropriate heating of the magnetic recording medium. Further, in the configuration including the light detector, the light source and the light detector are preferably provided on an overcoat layer formed on the element-integration surface of the substrate. Furthermore, a part of the diffraction optical element preferably acts as the detective light-path changer.

Further, in the thermally-assisted magnetic recording head according to the present invention, it is preferable that further provided in the element-integration surface of the substrate is a plasmon antenna that excites a surface plasmon by receiving the light propagating through the waveguide and generates a near-field light from its end surface on the opposed-to-medium surface side. In the case, the plasmon antenna is preferably opposed to an end portion on the opposed-to-medium surface side of the waveguide with a predetermined distance. Further in the case, the plasmon antenna preferably comprises an edge extending from a portion that is coupled with the light propagating though the waveguide in a surface plasmon mode to an near-field light generating end surface that generates the near-field light, the edge propagating the surface plasmon excited by the light.

Further, in the thermally-assisted magnetic recording head according to the present invention, the light source is preferably a photonic-crystal type surface-emitting laser diode having an output power of at least 50 mW (milliwatts). And the light emitted from the light-emitting surface of the light source preferably remains in a single mode until propagating through the waveguide, and also preferably remains in a linear polarization state until propagating through the waveguide.

According to the present invention, a head gimbal assembly (HGA) is further provided, which comprises the above-described thermally-assisted magnetic recording head and a suspension that supports the thermally-assisted magnetic recording head.

According to the present invention, a magnetic recording apparatus is further provided, which comprises: at least one HGA described above; at least one magnetic recording medium; and a recording control circuit that controls write operations that the thermally-assisted magnetic recording head performs to the at least one magnetic recording medium, the recording control circuit further including a light-emission control circuit that controls light-emission operations of the light source.

In the magnetic recording apparatus according to the present invention, the thermally-assisted magnetic recording head preferably further comprises: a light detector that measures an output power of the light source in order to adjust the output power; and at least one detective light-path changer that directs a part of light propagating between the light-emitting surface of the light source and the diffraction optical element toward the light detector, and the light-emission control circuit preferably controls the light-emission operations of the light source by using an output of the light detector. In the case, the light source and the light detector are preferably provided on an overcoat layer formed on the element-integration surface of the substrate.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 5a1 to 5a3 show cross-sectional views for explaining the principle of the binary lens;

FIGS. 5b1 and 5b2 show cross-sectional views and top views illustrating the structures of a different embodiment of binary lens;

FIGS. 5c1 and 5c2 show cross-sectional views and top views illustrating the structures of a different embodiment of binary lens;

DESCRIPTION OF THE PREFERRED EMBODIMENTS

Figure 1:
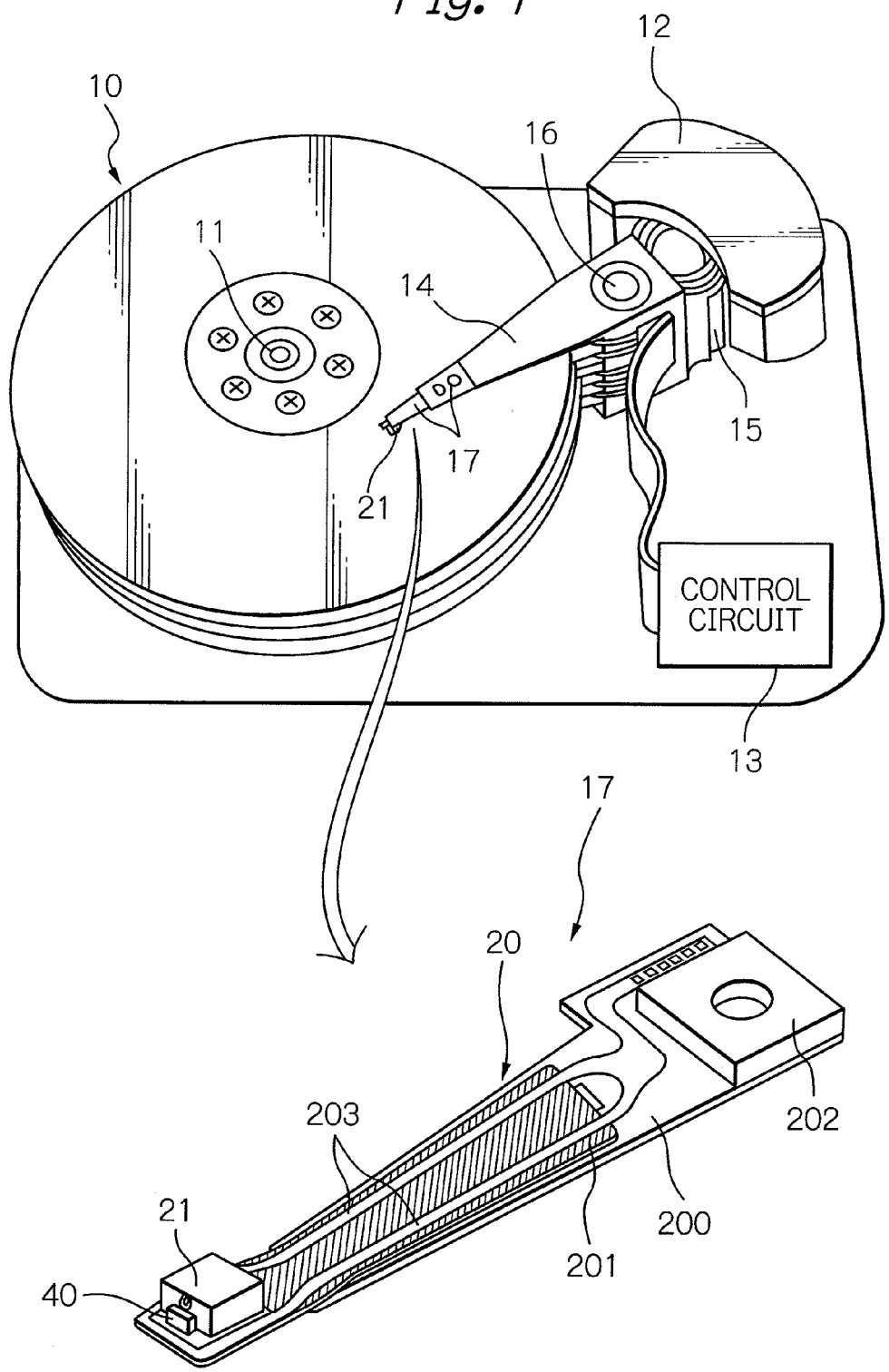
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and a head gimbal assembly (HGA) according to the present invention. Here, in the perspective view of the HGA, a face of the HGA opposed to the surface of the magnetic recording medium is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode 40 that the thermally-assisted magnetic recording head 21 includes.

The laser diode 40 is a light source for emitting laser light used for thermally-assisted magnetic recording, and is provided in the element-integration surface of a slider substrate that is a base of the thermally-assisted magnetic recording head 21. The laser diode 40 includes a photonic-band layer in which a light generated from an active layer resonates, and is, in the present embodiment, a photonic-crystal type surface-emitting laser diode. The magnetic disk 10 is, in the present embodiment, designed for perpendicular magnetic recording, and has a structure in which sequentially stacked on a disk substrate is: a soft-magnetic under layer; an intermediate layer; and a magnetic recording layer (perpendicular magnetization layer). The anisotropic magnetic field (coercive force) of the magnetic recording layer is set to be a sufficiently large value for stabilizing the magnetization in room temperature. The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be one.

Referring also to FIG. 1, a suspension 20 in the HGA 17 includes: a load beam 200; a flexure 201 with elasticity fixed to the load beam 200; and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201, that is, to the top end portion of the suspension 20 so as to face the surface of each magnetic disk 10 with a predetermined spacing (flying height). Moreover, one ends of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
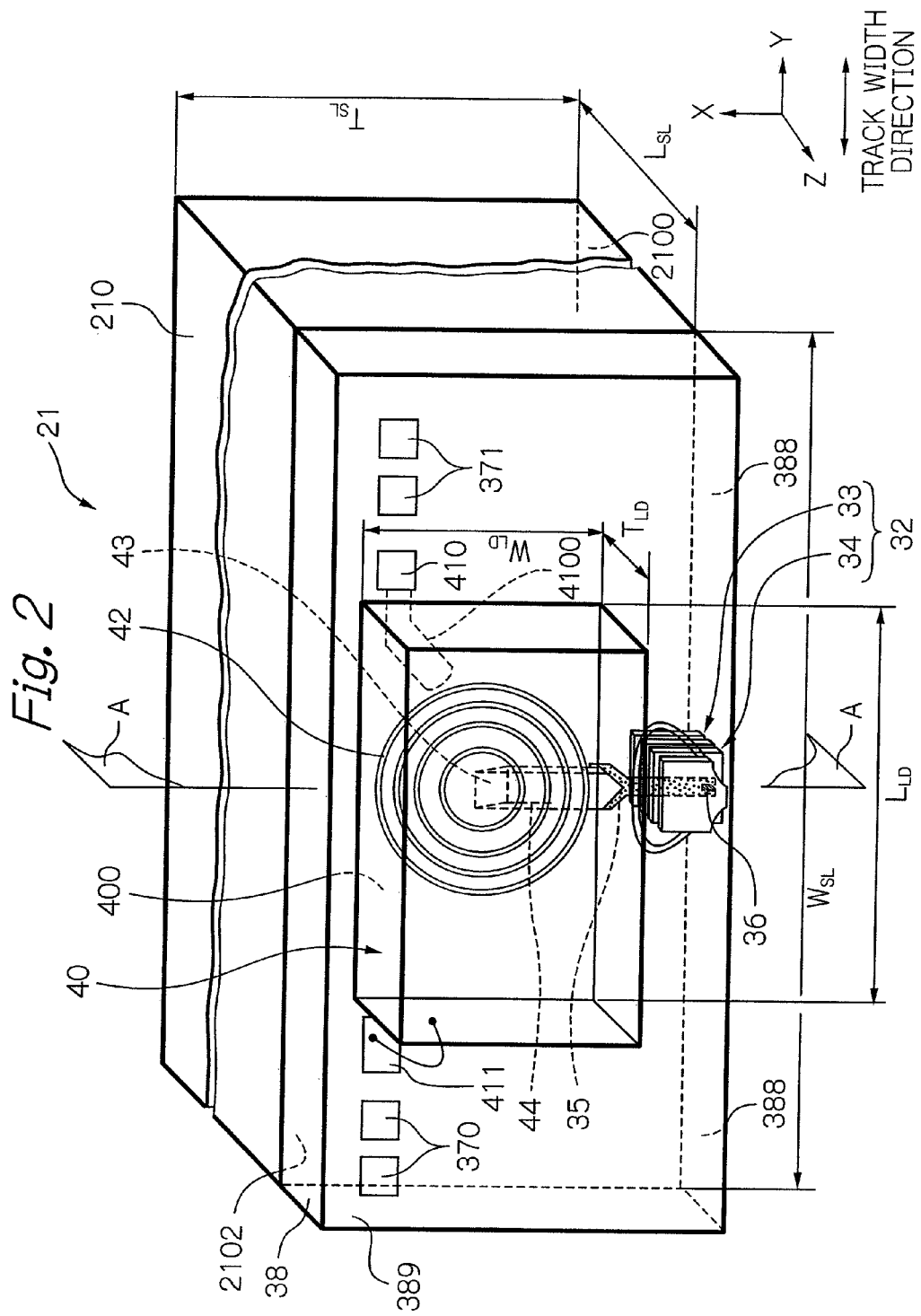
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 includes: a slider substrate 210 formed of, for example, AlTiC ($Al_2O_3$—TiC), and having an air bearing surface (ABS) 2100 as an opposed-to-medium surface processed so as to provide an appropriate flying height; a head element 32, a binary lens 42, a reflecting mirror 43, a spot-size converter 44, a waveguide 35 and a surface plasmon antenna 36, which are formed in an element-integration surface 2102 of the slider substrate 210, the surface 2102 being perpendicular to the ABS 2100; an overcoat layer 38 formed on the element-integration surface 2102, so as to cover these elements; and a laser diode 40 disposed on the upper surface 389 of the overcoat layer 38. The head end surface 388, which is a surface of the overcoat layer 38 opposed to the medium, and the ABS 2100 constitute the whole opposed-to-medium surface of the thermally-assisted magnetic recording head 21.

The head element 32 is constituted of a magnetoresistive (MR) element 33 for reading data from the magnetic disk and an electromagnetic transducer 34 for writing data to the magnetic disk. The laser diode 40 has a multilayered structure including an active layer for generating a light and a photonic-band layer having a periodic structure in which the generated light resonates. Here, the lower surface 400 that is a layer surface as an end surface of the multilayered structure is a light-emitting surface that emits laser light. The light-emitting surface 400 is opposed to the element-integration surface 2102, and is, in the present embodiment, bonded on the upper surface 389 of the overcoat layer 38.

The binary lens 42 is a diffraction optical element for converging the laser light emitted from the light-emitting surface 400 of the laser diode 40. And the reflecting mirror 43 is a light-path changer for changing the propagation direction of the laser light converged by the binary lens 42. Actually in the present embodiment, the reflecting mirror 43 changes the propagation of the laser light from a state in which the laser light is directed from the light-emitting surface 400 of the laser diode 40 toward the element-integration surface 2102 of the slider substrate 210 (the propagation in −Z direction) to a state in which the laser light is directed toward the head end surface 388 in the direction parallel to the element-integration surface 2102 (the propagation in −X direction). Further, the spot-size converter 44 is an optical element that receives the laser light the propagation direction of which is changed by the reflecting mirror 43, makes the spot size of the laser light changed (smaller), then guides the laser light into the waveguide 35. Further, the waveguide 35 is an optical path that receives the laser light, the propagation direction and spot size of which are adjusted by going through the reflecting mirror 43 and the spot-size converter 44, and then propagates the laser light toward the head end surface 388. Further, the surface plasmon antenna 36 is a near-field light generator that transforms the laser light (waveguide light) propagating through the waveguide 35 into near-field light. Here, the binary lens 42, the reflecting mirror 43, the spot-size converter 44, the waveguide 35, and the surface plasmon antenna 36 constitute a near-field light generating optical system within the head 21.

Furthermore, the thermally-assisted magnetic recording head 21 includes: a pair of terminal electrodes 370 exposed in the upper surface of the overcoat layer 38 and electrically connected to the MR element 33; a pair of terminal electrodes 371 also exposed in the upper surface of the overcoat layer 38 and electrically connected to the electromagnetic transducer 34; and a pair of terminal electrodes 410 and 411 also exposed in the upper surface of the overcoat layer 38 and electrically connected to the respective electrodes of the laser diode 40. These terminal electrodes 370, 371, 410 and 411 are electrically connected to the connection pads of the wiring member 203 provided on the flexure 201 (FIG. 1).

One ends of the MR element 33, the electromagnetic transducer 34, and the surface plasmon antenna 36 reach the head end surface 388 as an opposed-to-medium surface. During actual write and read operations, the thermally-assisted magnetic recording head 21 aerodynamically flies above the surface of the rotating magnetic disk 10 (FIG. 1) with a predetermined flying height. Thus, the ends of the MR element 33 and electromagnetic transducer 34 face the surface of the magnetic recording layer of the magnetic disk 10 with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light is emitted from the light-emitting surface 400 of the laser diode 40 disposed in the element-integration surface 2102 of the head 21, and propagates through the waveguide 35 after going through the binary lens 42, the reflecting mirror 43 and the spot-size converter 44, and then the laser light (waveguide light) is coupled with the surface plasmon antenna 36 in a surface plasmon mode, as described in detail later. As a result, surface plasmon is excited on the surface plasmon antenna 36. The surface plasmon propagates on a propagation edge provided in the surface plasmon antenna 36, which will be detailed later, toward the head end surface 388, which causes near-field light to be generated from the end on the head end surface 388 side of the surface plasmon antenna 36. The generated near-field light reaches the surface of the magnetic disk, and heats a portion of the magnetic recording layer of the disk. As a result, the anisotropic magnetic field (coercive force) of the portion is decreased to a value that enables writing; thus a thermally-assisted magnetic recording can be accomplished.

Also according to FIG. 2, the slider substrate 210 is preferably so-called a femto slider in which the thickness $T_{SL}$ (in X-axis direction) is 230 μm (micrometers), the width $W_{SL}$ in the track width direction (Y-axis direction) is 700 μm, and the length $L_{SL}$ (in Z-axis direction) is 850 μm. The femto slider is generally used as a substrate for thin-film magnetic heads capable of high-density recording, and has the smallest standardized size of all the sliders currently on the market. In this case, the element-integration surface 2102 of the slider substrate 210 is a region with the area of 230 μm ($T_{SL}$)×700 μm ($W_{SL}$).

The laser diode 40 is mounted in the element-integration surface 2102 with such a small area, and acts as a light source for generating laser light used for the thermally-assisted magnetic recording described above. The laser diode 40 is, in the present embodiment, a photonic-crystal type surface-emitting laser diode, and has a multilayered structure including an active layer for generating a light and a photonic-band layer having a periodic structure in which the generated light resonates. Here, the light-emitting surface 400 that emits laser light of the laser diode 40 is a lower surface of the multilayered structure, and is opposed to the element-integration surface 2102, and further is, in the present embodiment, bonded on the upper surface 389 of the overcoat layer 38. The height $T_{LD}$ of the laser diode 40 is, for example, in the range of approximately 50 to 200 μm. And the width $W_{LD}$ and the length $L_{LD}$ of the laser diode 40 is, for example, in the range of approximately 50 to 200 μm. These sizes of the laser diode 40 represents that the laser diode 40 can be mounted well within the element-integration surface 2102. By setting the laser diode 40 in the element-integration surface 2102, the construction of the optical system is completed in the stage of the wafer process, which makes this construction comparatively facilitated and simplified and allows improvement of mass-productivity.

The laser diode 40 is preferably a photonic-crystal type surface-emitting laser diode with an output of at least 50 mW (milliwatts). This laser diode enables a sufficient and rapid heating of a portion of the magnetic recording layer. In the photonic-crystal type surface-emitting laser diode, a laser light of a single-mode having an extremely small divergence angle (for example, 1° or less) can be emitted from the light-emitting surface 400. Further, the polarization of the emitted laser light can be set considerably freely; for example, a linear polarization can be realized, which is preferable for the excitation of surface plasmon explained later. Here, a single-mode means a state in which the beam spot has a circular or elliptical shape and the light intensity distribution is represented by the Gaussian distribution with single-peaked pattern. Whereas, a state in which the beam spot has a doughnut-shape or has a light intensity distribution with multi-peaked pattern is referred to as a multimode. The structure and characteristic of the laser diode 40 will be explained in detail later with reference to FIG. 4.

Also as shown in FIG. 2, the terminal electrode 410 is electrically connected, through a lead electrode 4100, with a p-electrode 40j (FIG. 4) formed on the light-emitting surface 400 that is a lower surface (bottom surface) of the laser diode 40. And the terminal electrode 411 is electrically connected with an n-electrode 40a (FIG. 4) that corresponds to an upper surface of the laser diode 40. The terminal electrode 411 and the n-electrode 40a may be connected to each other by wire-bonding as shown in FIG. 2, or by solder-ball bonding (SBB) with a solder. By electrically connecting the terminal electrodes 410 and 411 to connection pads of the wiring member 203 provided on the flexure 201 (FIG. 1), a predetermined voltage can be applied to the laser diode 40 through both electrodes 410 and 411. This voltage application causes laser light to be emitted from the light-emitting surface 400 of the laser diode 40.

Further, an electric source provided within the magnetic disk apparatus can be used for driving the laser diode 40. In fact, the magnetic disk apparatus usually has an electric source with an applying voltage of, for example, approximately 2 to 5 V, which is sufficient for the laser oscillation. The laser diode 40 preferably has an output power of at least 50 mW as described above; even in the case that the amount of electric power consumption of the laser diode 40 is, for example, in the neighborhood of one hundred mW, the amount can be covered sufficiently by the electric source provided within the magnetic disk apparatus. Further, the laser diode 40 and terminal electrodes 410 and 411 are not limited to the above-described embodiment. For example, other configurations of the laser diode 40 and the terminal electrodes 410 and 411 may be possible. Further, at least one electrode of the laser diode 40 can electrically be connected directly with the connection pads of the wiring member 203.

Figure 3:
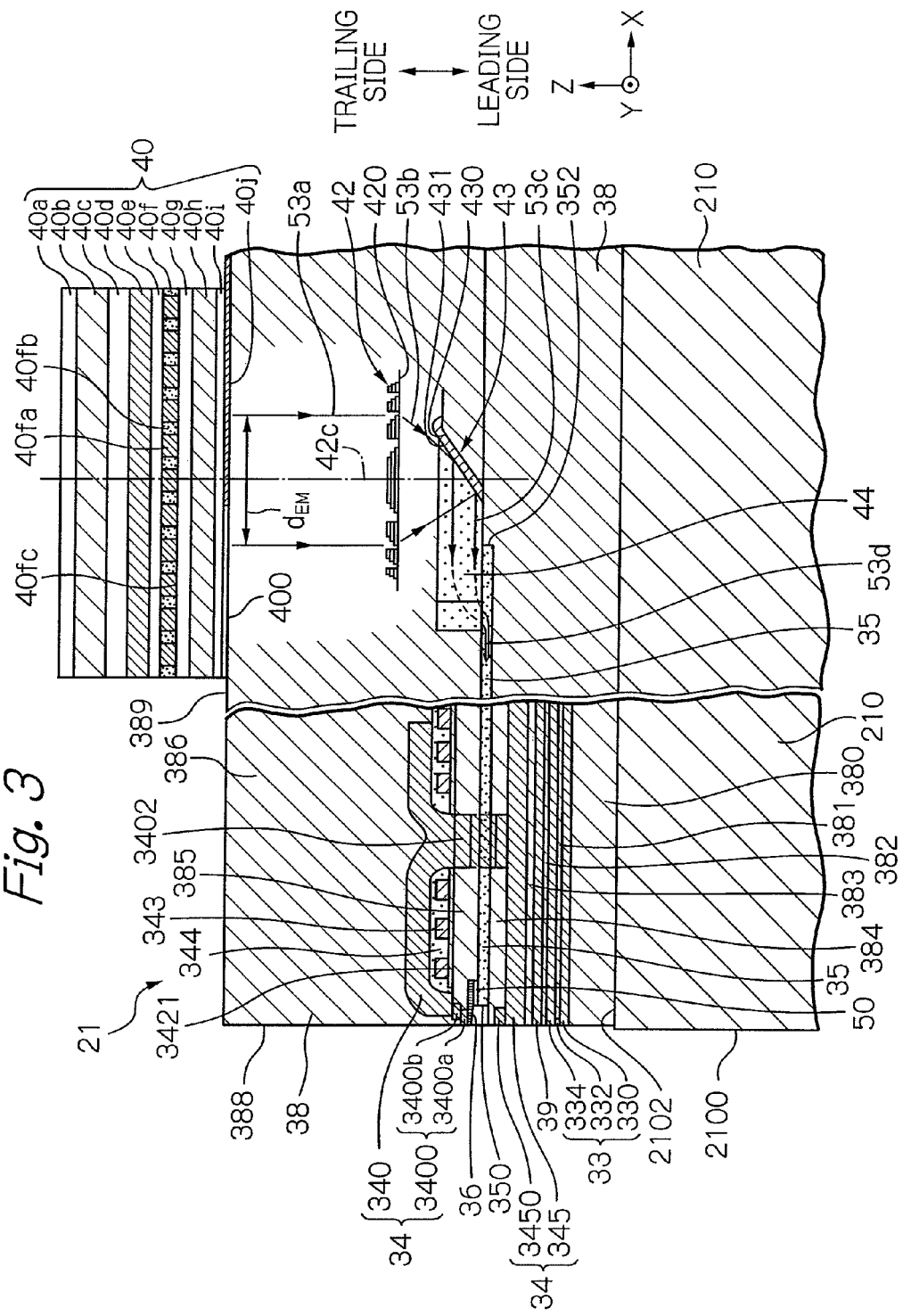
FIG. 3 shows a cross-sectional view taken by plane A in FIG. 2, schematically illustrating the configuration of the head element, the near-field light generating optical system, and their vicinity in the thermally-assisted magnetic recording head according to the present invention.

FIG. 3 shows a cross-sectional view taken by plane A in FIG. 2, schematically illustrating the configuration of the head element 32, the near-field light generating optical system, and their vicinity in the thermally-assisted magnetic recording head 21.

As shown in FIG. 3, the MR element 33 is formed on an insulating layer 380 stacked on the element-integration surface 2102, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The MR multilayer 332 is a magnetosensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Referring also to FIG. 3, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 includes: a first main pole portion 3400*a* (FIG. 6) reaching the head end surface 388 and having a small width $W_P$ (FIG. 7) in the track width direction; and a second main pole portion 3400*b* (FIG. 6) located on the first main pole portion 3400*a* and at the rear (+X side) of the portion 3400*a*. The small width $W_P$ of the first main pole portion 3400*a* enables the generation of a fine write magnetic field responding to higher recording density. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400*a* is, for example, in the range of approximately 0.1 to 0.8 μm.

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340 and the write shield layer 345. The write coil layer 343 has a monolayer structure in the present embodiment; however, may have a two or more layered structure or a helical coil shape. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of an soft-magnetic material, and its thickness is, for example, approximately 0.5 to 5 μm. Further, the lower shield 3450 is a part of the magnetic path, being connected with the lower yoke layer 345 and reaching the head end surface 388. The lower shield 3450 is opposed to the main magnetic pole 3400 through the surface plasmon antenna 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the main pole portion 3400*a* to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 3, the laser diode 40 is disposed within the element-integration surface 2102, and is bonded on the overcoat layer 38 in such a way that the light-emitting surface 400 has a surface contact with the upper surface 389 of the overcoat layer 38 or is opposed to the upper surface 389. In the present embodiment, the laser diode 40 is a photonic-crystal type surface-emitting laser diode, and has a multilayered structure including: an n-electrode 40*a* as an upper surface; a p-electrode 40*j* provided on the light-emitting surface 400; an n-clad layer 40*b*; a p-clad layer 40*h*; an active layer 40*d* for generating a light, provided between the n-clad layer 40*b* and the p-clad layer 40*h*; and a photonic-band layer 40*f* having a periodic structure in which the generated light resonates, provided between the active layer 40*d* and the p-clad layer 40*h*.

The photonic-band layer 40*f* has a periodic structure in which, in a medium 40*fa* having the first refractive index $n_{F1}$, a plurality of optical elements 40*fb* having the second refractive index $n_{F2}$ different from the first refractive index $n_{F1}$ are arranged two-dimensionally and periodically. When a predetermined voltage is applied to between the n-electrode 40*a* and the p-electrode 40*j*, a light is generated by the recombination of an electron and a positive hole in the active layer. In the generated lights, a light having a wavelength comparable with (nearly equal to) the period of the periodic structure of the photonic-band layer 40*f* resonates within the layer 40*f*. Thus, only the light with wavelength and phase specified by the resonance proceeds in the direction perpendicular to a (two-dimensional periodic) plane 40*fc* in which the two-dimensional period of the photonic-band layer 40*f* lies (in the thickness direction: in Z-axis direction). As a result, a laser light 53*a* of a single-mode, having a predetermined beam cross-section area and an extremely small divergence angle (an almost-collimated light) is emitted from the light-emitting surface 400 toward the binary lens 42 in −Z direction.

The binary lens 42 is a diffraction optical element for converging the laser light emitted from the light-emitting surface 400 of the laser diode 40. In the present embodiment, an optical axis 42*c* of the binary lens 42 is set to be parallel with Z-axis, and a lens surface 420 of the binary lens 42 perpendicular to the optical axis 42*c* is set to be parallel with (the element-integration surface 2102 and) the (two-dimensional periodic) plane 40*fc* in which the two-dimensional period of the photonic-band layer 40*f* lies. These settings enable the binary lens 42 to be comparatively easily formed in the element-integration surface 2102 of the slider substrate 210 by using a thin-film fine processing technique; and enable the laser diode 40 to be easily provided on the upper surface 389 of the overcoat layer 38; then, the optical axis alignment between the laser diode 40 and the binary lens 42 can comparatively easily be implemented by using Z-axis as a standard. Here, the laser light emitted from the laser diode 40 is not directed toward a diffraction grating. Therefore, there is no need to provide the laser diode 40 in such a way as to be inclined from the upper surface 389 of the overcoat layer 38 for the purpose of the increase in intensity of the light propagating from the diffraction grating to the waveguide. This facilitates the setting of the laser diode 40 onto the upper surface 389.

Further, the binary lens 42 can hold the capability of diffraction, even under some variation of the wavelength of the incident light. In fact, a simulation experiment was implemented, in which the binary lens 42 shown in FIGS. 5*b*1 and 5*b*2 described later received the laser light with a wavelength of 955, 960, or 965 nm (nanometers). As the simulation result, the coupling efficiency, in the occasion that the laser light passed through the binary lens 42 and was then reflected by the reflecting mirror 43; thus the spot-size converter 44 receives the laser light, was 30.0% in each case of the above-described wavelengths. From this result, it is understood that the binary lens 42 can hold its capability of diffraction as designed, even under a wavelength variation of approximately plus or minus 5 nm. For reference sake, the temperature assumed as the use environment of magnetic disk apparatuses is in the range of, for example, −5° C. to 60° C. For the temperature range, semiconductor laser is generally assumed to have a wavelength variation of, for example, approximately plus or minus 5 nm. On the other hand, generally, the diffraction capability of the diffraction grating is known to be significantly varied by the wavelength variation of, for example, approximately plus or minus 5 nm.

The reflecting mirror 43 is, in the present embodiment, a light-path changer for changing the propagation direction of the laser light 53b converged by the binary lens 42 into a laser light 53c with different propagation direction. The reflecting mirror 43 changes the propagation of the laser light from a state in which the laser light is directed from the light-emitting surface 400 of the laser diode 40 toward the element-integration surface 2102 of the slider substrate 210 (the propagation in −Z direction) to a state in which the laser light is directed toward the head end surface 388 in the direction parallel to the element-integration surface 2102 (the propagation in −X direction). The reflecting mirror 43 can be formed by stacking a layer made of a material having a high reflectance and sufficiently low transmission and absorption for the wavelength of the laser light 53b on an inclined plane 430 having a predetermined inclination angle (45° in FIG. 3) to the element-integration surface 2102. The material can be, for example, a metal such as Au, Al, Ta or, NiFe. The layer surface 431 of the material layer acts as a reflecting surface. Alternatively, a prism can be used as a light-path changer that changes the laser light 53b into the laser light 53c, instead of the reflecting mirror 43. Further, according to FIG. 3, the light-path changer (reflecting mirror 43) and the spot-size converter 44 are integrated in order to suppress unwanted reflection and scattering; however, alternatively, they may be separated as individual elements.

The laser light 53c reflected by the reflecting mirror 43 propagates through the spot-size converter 44. The spot-size converter 44 is an optical element that makes the spot size of the laser light 53c changed (smaller), then guides the laser light 53c into the waveguide 35. Further, the waveguide 35 is an optical path that receives the laser light, the propagation direction and spot size of which are adjusted by going through the reflecting mirror 43 and the spot-size converter 44, and then propagates the laser light toward the head end surface 388. The waveguide 35 extends from the rear-end surface 352 to the end surface 350 on the head end surface 388 side through the through-hole that is provided in the back contact portion 3402 and extends in X-axis direction. Furthermore, the surface plasmon antenna 36 is a near-field light generator that transforms the laser light (waveguide light) propagating through the waveguide 35 into near-field light.

As shown also in FIG. 3, a part on the head end surface 388 side of the waveguide 35 and the surface plasmon antenna 36 are provided between the lower shield 3450 (lower yoke layer 345) and the main magnetic pole 3400 (upper yoke layer 340). Further, a portion of the upper surface (side surface) of the waveguide 35 on the head end surface 388 side is opposed to a portion of the lower surface (including a propagation edge 360 (FIG. 6)) of the surface plasmon antenna 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the surface plasmon antenna 36 in a surface plasmon mode. Here, the buffering portion 50 may be a portion of an insulating layer 385 that is a part of the overcoat layer 38, or a new layer provided other than the insulating layer 385. A detailed explanation of the near-field light generating optical system including the spot-size converter 44, the waveguide 35, the surface plasmon antenna 36, and the buffering portion 50 will be given later with reference to FIG. 6.

Alternatively, a plasmon antenna made of a metal plate piece can be used, instead of the surface plasmon antenna 36, to generate near-field light by being irradiated with the waveguide light from the waveguide 35. Various other embodiments of surface plasmon antenna or plasmon antenna could be used. In any case, the laser light emitted from the laser diode 40 disposed in the element-integration surface 2102 can surely be coupled with a surface plasmon antenna or a plasmon antenna. Further, another alternative without using near-field light generators can be applied, in which the magnetic recording layer of a magnetic disk is irradiated directly with laser light emitted from the waveguide 35 to heat a portion of the magnetic recording layer.

Further, also as shown in FIG. 3, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the insulating layers 381, 382, 383, 384, 385 and 386 constitute the overcoat layer 38.

Figure 4:
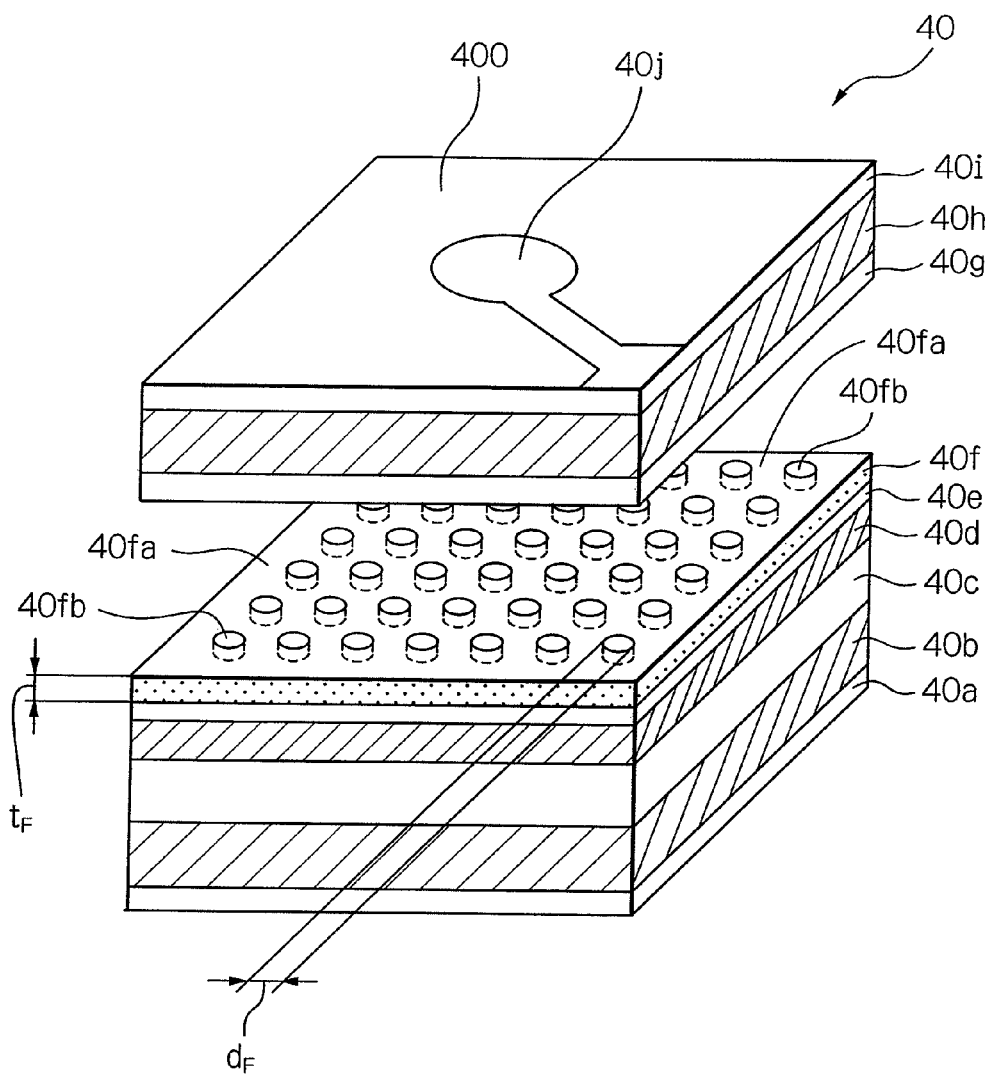
FIG. 4 shows a perspective view illustrating the structure of the laser diode in the head according to the present invention.

FIG. 4 shows a perspective view illustrating the structure of the laser diode 40. In the figure, for easy viewability of the periodic structure of the photonic-band layer 40f, the layer 40f and a spacer layer 40g are separated from each other. Further, for easy viewability of the p-electrode 40j, the light-emitting surface 400, which corresponds to a bottom surface, is presented as the upper side in FIG. 3.

Referring to FIG. 4, the laser diode 40 includes: a n-clad layer (substrate) 40b made of, for example, n-type AlGaAs; a p-clad layer 40h made of, for example, p-type AlGaAs; an active layer 40d having a multilayered structure of multiquantum well made of, for example, InGaAs layers and GaAs layers, and provided between the n-clad layer 40b and the p-clad layer 40h; and a photonic-band layer 40f provided between the active layer 40d and the p-clad layer 40h. Further, an n-electrode 40a is provided on the opposite side to the active layer 40d in relation to the n-clad layer 40b. And a p-electrode 40j is provided on the opposite side to the active layer 40d in relation to the p-clad layer 40h, through a contact layer 40i made of, for example, p-type GaAs. Further, a spacer layer 40c made of, for example, n-type GaAs is provided between the n-clad layer 40b and the active layer 40d, and a spacer layer 40e made of, for example, p-type GaAs is provided between the active layer 40d and the photonic-band layer 40f. Furthermore, a spacer layer 40g made of, for example, p-type GaAs is provided between the photonic-band layer 40f and the p-clad layer 40h.

The photonic-band layer 40f has a periodic structure in which, in a medium 40fa having the first refractive index $n_{F1}$, a plurality of optical elements 40fb having the second refractive index $n_{F2}$ different from the first refractive index $n_{F1}$ are arranged two-dimensionally and periodically. The medium 40fa can be formed of, for example, a semiconductor material such as p-type GaAs. And the optical elements 40fb can be vacancy openings ($n_{F2} > n_{F1}$) passing through the layer 40f, which are provided in the medium 40fa. Alternatively, the optical elements 40fb can be a part formed of a material that has the second refractive index $n_{F2}$ different from the first refractive index $n_{F1}$, the part being formed of an insulating material such as $Al_2O_3$ (alumina) or $SiO_2$ (silicon oxide) or a semiconductor material.

As shown also in FIG. 4, the optical elements 40*fb* of the photonic-band layer 40*f* has a cross-section with circular shape, however, they may have a cross-section with a shape of ellipsoid, a polygon such as triangle, or with one of other various shapes. Further, a plurality of optical elements 40*fb* are arranged periodically within the layer 40*f*, and form a two-dimensional diffraction grating having square lattice the repeating unit of which is a square. The two-dimensional diffraction grating may be a lattice the repeating unit of which is, for example, another quadrangle such as a rhombus, a triangle, a hexagon or the like. By adjusting the refractive index $n_{F2}$, the cross-sectional shape, and the arrangement of these optical elements 40*fb*, there can be set and controlled the wavelength, the mode, the polarization and so on of the resonated laser light considerably freely.

In the above-described laser diode 40 formed of GaAs-type material, the thickness $t_F$ of the photonic-band layer 40*f* is, for example, in the range of approximately 0.1 to 0.5 µm, and the diameter $d_F$ of the cross-section of the optical element 40*fb* is, for example, in the range of approximately 0.05 to 0.2 µm. Further, the wavelength $\lambda_L$ of the laser light emitted from the laser diode 40 is determined by the period of the two-dimensional diffraction grating that the optical elements 40*fb* form. The period is, for example, in the range of approximately 0.1 to 0.4 µm. Alternatively, as the laser diode 40, InP base, GaAs base or GaN base diodes can be utilized, and the wavelength $\lambda_L$ may be, for example, in the range of 375 nm (nanometers) to 1.7 µm. Therefore, the period of the two-dimensional diffraction grating of the optical elements 40*fb* is adjusted to an appropriate value within usable wavelength-range. Further, alternatively, the photonic-band layer may be disposed between the n-clad layer 40*b* and the active layer 40*d*, instead of between the active layer 40*d* and the p-clad layer 40*h*. Furthermore, an additional photonic-band layer can be provided between the n-clad layer 40*b* and the active layer 40*d*, together with the photonic-band layer 40*f* disposed between the active layer 40*d* and the p-clad layer 40*h*.

The two-dimensional diffraction grating within the photonic-band layer 40*f* has a property that, when lights propagate therein in at least two different directions with the same period respectively, these lights are overlapped. That is, a light that propagates from a lattice point of the two-dimensional diffraction grating along a direction returns to the original lattice point going through a plurality of diffractions. This property is derived from a dispersion relation (photonic-band) that is energy states of the light (photon) which senses the periodic refractive-index distribution of the two-dimensional diffraction grating. Here, the overlapped lights come into a resonant state. That is, the laser diode 40 does not include a light resonator (cavity) having reflecting plates opposed to each other as edge-emitting type diodes have; however, the very two-dimensional diffraction grating within the photonic-band layer 40*f* functions as a light resonator, that is, a wavelength selector.

Actually, by applying a predetermined voltage between the n-electrode 40*a* and the p-electrode 40*j* of the laser diode 40, a light is generated by the recombination of an electron and a positive hole in the active layer 40*d*. When the generated lights reach the photonic-band layer 40*f*, a light of the generated lights, having the same wavelength as the period of the two-dimensional diffraction grating of the photonic-band layer 40*f*, resonates within the layer 40*f*, and its phase is specified. The light with the specified wavelength and phase propagates to the active layer 40*d*, and expedites the inductive emission in the active layer 40*d*. Then, the inductively-emitted light again propagates to the photonic-band layer 40*f*. Here, the wavelength and phase of the light satisfy the conditions for wavelength and phase in the two-dimensional diffraction grating of the photonic-band layer 40*f*. As a result, the light with a uniform wavelength and phase is amplified, and this phenomenon occurs in the region within the layers with the p-electrode 40*j* as a center. Therefore, the light with a uniform wavelength and phase propagates in the direction perpendicular to the active layer 40*d* and the photonic-band layer 40*f*, and finally, is emitted as a laser beam having a predetermined cross-section from the light-emitting surface 400.

As is clear from the above-described principle, the laser diode 40 enables the emitted light to have a larger spot size and further a higher degree of parallelization, that is, an extremely smaller divergence angle (for example, 1° or less), compared with a surface-emitting laser diode such as a VCSEL having no photonic-band layers. Further, the laser diode 40 can easily realize a laser light with a single-mode, based on the above-described principle. The laser light having a single-mode has a characteristic that, even when the laser light is squeezed, a laser light having a peak with a desired intensity can be obtained. Whereas, when a laser light with a multimode is squeezed, the negation of intensities occurs, and thus the loss is increased. Moreover, the laser diode 40 also enables emitted lights with various types of polarizations by adjusting the arrangement of the optical elements 40*fb*.

Furthermore, the laser diode 40 can have a significantly high output. For example, in a VCSEL, the thickness of the active region corresponds to the cavity length; the thickness is at best in the range of, for example, approximately 2 to 10 µm. Therefore, the output of the VCSEL usually remains at several mW (milliwatts) in CW (Continuous Wave) operation. On the other hand, the laser diode 40 of photonic-crystal surface-emitting type enables its output to be significantly enhanced by adequately enlarging the region of existence of the light that travels between the active layer 40*d* and the photonic-band layer 40*f* and has a uniform wavelength and phase (the spot region of the emitted light). In fact, an experiment result has been obtained, in which the output exceeded 1000 mW. The spot diameter d (FIG. 3) of the spot region of the emitted light can be set to be, for example, in the range of 30 to 100 µm, in consideration of the incidence into the binary lens 42.

Detailed explanations for laser diodes of photonic-crystal surface-emitting type are made in, for example, Kyosuke Sakai et al. "Lasing Band-Edge Identification for a Surface-Emitting Photonic Crystal Laser" IEEE JOURNAL ON SELECTED AREAS IN COMMUNICATIONS, Vol. 23, No. 7, p. 1335-1340 (2005), and U.S. Pat. No. 6,711,200 B1.

FIGS. 5*a*1 to 5*a*3 show cross-sectional views for explaining the principle of the binary lens 42. In the figures, only a right half of the lens cross-section is depicted for simplicity. Further, FIGS. 5*b*1 and 5*b*2 and FIGS. 5*c*1 and 5*c*2 show cross-sectional views and top views illustrating the structures of different embodiments of binary lenses.

At the start, explained below is the principle of the binary lens 42. First, as the cross-section shown in FIG. 5*a*1, prepared is a convex lens with a usual curved surface having a desired optical function. Then, as shown in FIG. 5*a*2, material corresponding to a length in the thickness direction of an integral multiple of wavelength λ, of the applied laser light is appropriately removed from the lens so as for the lens thickness to be reduced; thereby formed is a Fresnel lens. After that, as the cross-section shown in FIG. 5*a*3, a cross-section that discretely approximates the cross-section of the Fresnel lens shown in FIG. 5a2 is formed by using, for example, a step structure having three layers with the unit of thickness one fourth of the wavelength λ of the laser light. Generally, in the case of setting the unit of thickness to be a length of minus n-th power of 2 times of the wavelength λ, the number of layers in the step structure is (n−1). Here, the larger the value of n is, the more the number of layers increases and the closer becomes the approximation, which can ensure an optical function closer to that of the original convex lens. However, it takes more time and effort to increase the number of layers. This optical step structure having a cross-section as shown in FIG. 5a3 corresponds to a binary lens, and can fulfill an optical function comparable with that of the original convex lens having a cross-section shown in FIG. 5a1, even though having a thinner structure than the original convex lens.

The binary lens 42 shown in FIGS. 5b1 and 5b2 is a multilayer pattern having a cross-section equivalent to that shown in FIG. 5a3, in which the first, the second and the third diffraction-grating layers 42a, 42b and 42c are appropriately stacked, the layers being annular and parallel to the element-integration surface 2102. The first, the second and the third diffraction-grating layers 42a, 42b and 42c are formed of a material having a higher refractive index than that of the surrounding insulating layers 550 and 551. For example, in the case that the wavelength $\lambda_L$ of the laser light is 600 nm and the insulating layers 550 and 551 are formed of $Al_2O_3$ (n=1.63), the first, the second and the third diffraction-grating layers 42a, 42b and 42c can be formed of, for example, $Ta_2O_5$ (n=2.16), $Nb_2O_5$ (n=2.33), TiO (n=2.3-2.55) or $TiO_2$ (n=2.3-2.55). The thickness of the binary lens 42 at its center portion can be set to be equal to the laser-light wavelength or less. That is, because the binary lens 42 can be made up into a thin plate-shaped one by using a thin-film fine processing technique, the binary lens 42 is extremely suitable as an optical component within the thermally-assisted magnetic recording head 21. Here, the binary lens 42 shown in FIGS. 5b1 and 5b2 corresponds to the case that the unit of thickness is one fourth of the wavelength of the laser light, as described above. Alternatively, there can be formed a binary lens 42 with the unit of thickness a half, one eighth or the like of the wavelength.

The binary lens 42' shown in FIGS. 5c1 and 5c2 is an optical system formed by combining the first lens portion 421' and the second lens portion 422'. The first lens portion 421' is a multilayer pattern extending in the track width direction (Y-axis direction) within a lens plane 4210' parallel to the element-integration surface 2102, and the portion 421' plays a role of converging the laser light in X-axis direction. The second lens portion 422' is a multilayer pattern extending in X-axis direction, and the portion 422' plays a role of converging the laser light in the track width direction (Y-axis direction). As just described, by combining two of, or three or more of lens portions, the laser light emitted from the laser diode 40 and having a spot with a large area can be converged into a laser light having a spot with a desired shape and size.

Figure 6:
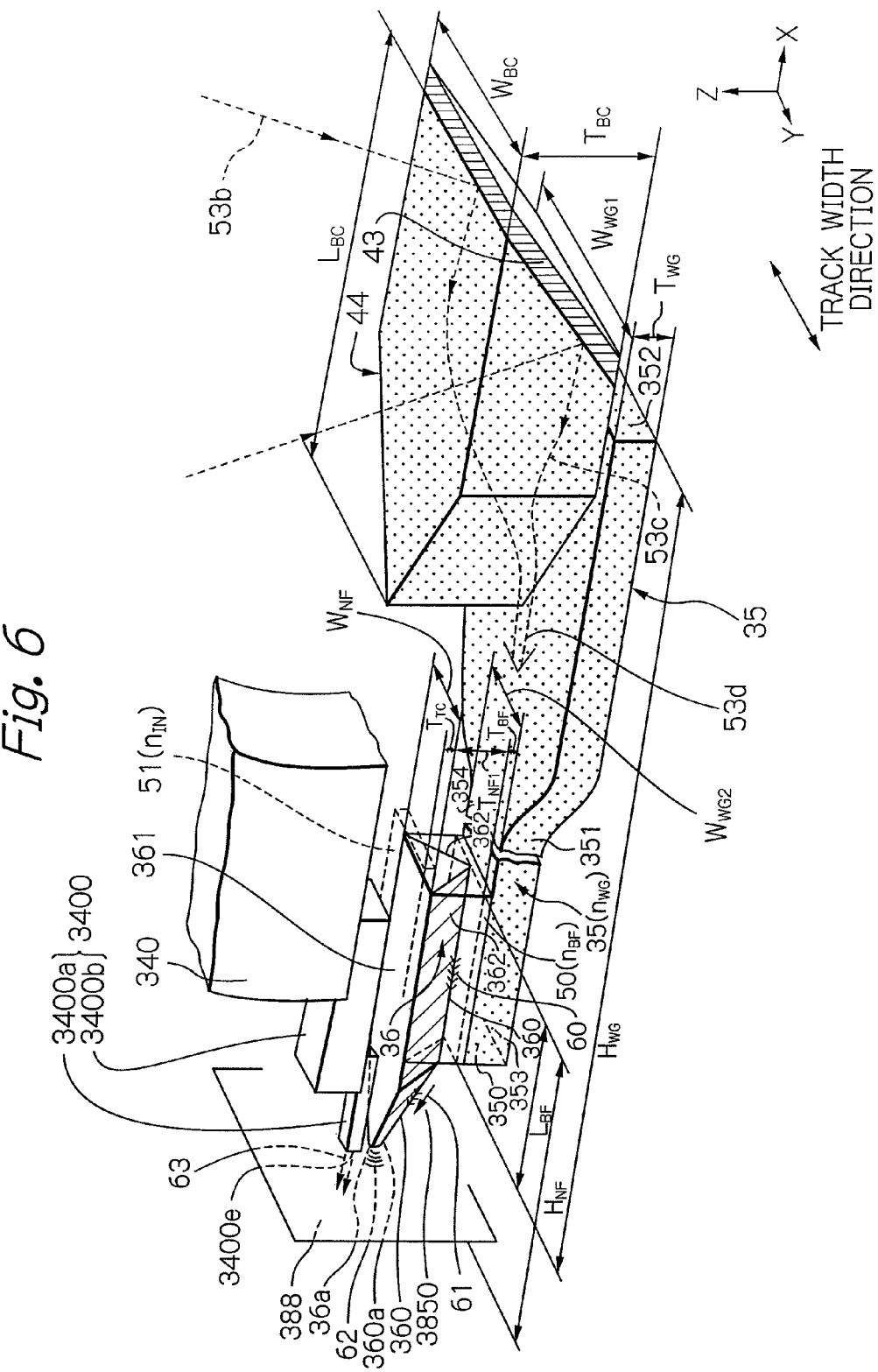
FIG. 6 shows a perspective view schematically illustrating the configuration of the reflecting mirror, the spot-size converter, the waveguide, the surface plasmon antenna and the main magnetic pole in the head according to the present invention.

FIG. 6 shows a perspective view schematically illustrating the configuration of the reflecting mirror 43, the spot-size converter 44, the waveguide 35, the surface plasmon antenna 36 and the main magnetic pole 3400. In the figure, the head end surface 388 is positioned at the left side, the surface 388 including positions where write field and near-field light are emitted toward the magnetic recording medium.

As shown in FIG. 6, the configuration includes the reflecting mirror 43, the spot-size converter 44, the waveguide 35 for propagating laser light 53d used for generating near-field light, and the surface plasmon antenna 36 that has a propagation edge 360 as an edge on which surface plasmon excited by the laser light (waveguide light) 53d propagates. The spot-size converter 44 is an optical element that makes the spot size of the laser light 53c reflected by the reflecting mirror 43 changed (smaller), then guides the laser light 53c into the waveguide 35. The spot-size converter 44 is provided on the wide-width end portion of the waveguide 35 on the opposite side to the head end surface 388; and the lower surface of the spot-size converter 44 has a surface contact with the upper surface 354 of the waveguide 35. The width $W_{BC}$ of the converter 44 in the track width direction (Y-axis direction) near the reflecting mirror 43 can be in the range of, for example, 1 to 5 μm, as well as the width $W_{WG1}$ of the waveguide 35 near the rear-end surface 352. Further, the thickness $T_{BC}$ (in Z-axis direction) of the converter 44 can also be in the range of, for example, 1 to 5 μm. The length $L_{BC}$ (in X-axis direction) of the spot-size converter 44 can be set to be in the range of, for example, 20 to 100 μm.

As shown also in FIG. 6, the end portion of the spot-size converter 44 on the head end surface 388 side tapers toward the head end surface 388. The laser light 53c propagating toward the head end surface 388 (in −X direction) makes the transition to the waveguide 35 by gradually sensing the narrower propagation region due to the above-described structure of the converter 44; then the laser light 53c shifts to the laser light (waveguide light) 53d propagating through the waveguide 35. The waveguide 35 extends from the rear-end surface 352 to the end surface 350 on the head end surface 388 side, and the waveguide light 53d propagating through the waveguide 35 reaches a portion of the waveguide 35 opposed to the surface plasmon antenna 36. Here, the spot-size converter 44 and the waveguide 35 can be integrated by using the same material.

The spot diameter of the laser light, which is converged by the binary lens 42 and is reflected by the reflecting mirror 43 and then enters the spot-size converter 44, that is, the spot diameter of the laser light that has just been reflected by the mirror 43 is preferably 2 to 20 times larger than the spot diameter of the laser light that has just entered the waveguide 35. Specifically, the spot diameter of the just-reflected laser light is preferably in the range of 1.0 to 10 μm. That is, it is preferable that the degree of the convergence of the laser light by the binary lens 42 is set so as to satisfy the above-described conditions, in consideration of the desired spot diameter in the waveguide 35. This setting enables the laser light shifting from the converter 44 to the waveguide 35 not to turn into a multimode. Actually, the spot-size converter 44 plays an important role when a laser diode 40 having a sufficiently large spot diameter $d_{EM}$ of the emitted beam is provided to obtain higher output power. The spot-size converter 44 converts a laser light with a large spot diameter into a laser light with a smaller spot diameter, and can further guide the converted laser light to the waveguide 35 in such a way that the laser light holds a low loss and a single-mode.

Actually, it has been found out from an experiment that, in the case of setting the above-described conditions, for example, setting the thickness $T_{BC}$ of the spot-size converter 44 to be 5 μm and the thickness $T_T$ of the waveguide 35 to be 0.5 μm, the spot-size converter 44 converts the spot diameter of the laser light 53c into one-tenth or less of that; thus the light loss in the propagation from the converter 44 to the waveguide 35 is sufficiently suppressed, and further the shift to a multimode is avoided. Alternatively, the laser light 53c from the reflecting mirror 43 could enter the waveguide 35 directly without using the spot-size converter 44. In the case, the spot diameter d of the emitted beam is required to be limited so that the spot size of the laser light entering the waveguide 35 becomes sufficiently small. That is, setting the limited spot diameter d is required in order to avoid a situation that a sufficient output power cannot eventually be obtained.

The surface plasmon antenna 36 includes: a propagation edge 360 that is an edge on which surface plasmon excited by the waveguide light 53d propagates; and a near-field light generating end surface 36a that reaches the head end surface 388 and is a destination for the propagating surface plasmon. Further, a buffering portion 50 is a portion sandwiched between a portion of the side surface 354 of the waveguide 35 and a portion of the lower surface 362 including the propagation edge 360 of the surface plasmon antenna 36. That is, a portion of the propagation edge 360 is covered with the buffering portion 50. The buffering portion 50 acts for coupling the waveguide light 53d with the surface plasmon antenna 36 in a surface plasmon mode. Further, the propagation edge 360 plays a role of propagating the surface plasmon excited by the waveguide light 53d to the near-field light generating end surface 36a. Here, side surfaces of the waveguide 35 are defined as, out of end surfaces surrounding the waveguide 35, end surfaces other than the end surface 350 on the head end surface 388 side and the rear end surface 352 on the opposite side. These side surfaces serve as surfaces on which the propagating waveguide light 53d can be totally reflected in the waveguide 35 that corresponds to a core. In the present embodiment, the side surface 354 of the waveguide 35, a portion of which is in surface contact with the buffering portion 50, is the upper surface of the waveguide 35. And, the buffering portion 50 may be a portion of the overcoat layer 38 (FIG. 2), or may be provided as a new layer other than the overcoat layer 38.

Specifically, the waveguide light 53d, which has advanced to near the buffering portion 50, is involved with the optical configuration including the waveguide 35 with a refractive index $n_{NG}$, the buffering portion 50 with a refractive index $n_{BF}$ and the surface plasmon antenna 36 made of a metal, and induces a surface plasmon mode on the propagation edge 360 of the surface plasmon antenna 36. That is, the waveguide light couples with the surface plasmon antenna 36 in a surface plasmon mode. The induction of the surface plasmon mode becomes possible by setting the refractive index $n_{BF}$ of the buffering portion 50 to be smaller than the index n of the waveguide 35 ($n_{BF} < n_{WG}$). Actually, evanescent light is excited within the buffering portion 50 under an optical boundary condition between the waveguide 35 as a core and the buffering portion 50. Then, the evanescent light couples with the fluctuation of electric charge excited on the metal surface (propagation edge 360) of the surface plasmon antenna 36, and induces the surface plasmon mode, thereby excited is surface plasmon 60. To be exact, there excited is surface plasmon polariton in this system because surface plasmon as elementary excitation is coupled with an electromagnetic wave. However, the surface plasmon polariton will be hereinafter referred to as surface plasmon for short. The propagation edge 360 is located closest to the waveguide 35 on the inclined lower surface 362 of the surface plasmon antenna 36, and is just an edge where electric field tends to converge; thus surface plasmon can easily be excited on the edge 360.

In the head structure as shown in FIGS. 3 and 6, the laser light 53a emitted from the light-emitting surface 400 of the laser diode 40 preferably has a linear polarization in which the oscillation direction of electric field of the laser light is X-axis direction. Further, the laser light 53b resultingly have a linear polarization in which the oscillation direction of electric field of the laser light is X-axis direction, and then the laser light 53c and the laser light 53d preferably have a linear polarization in which the oscillation direction of electric field of the laser light is Z-axis direction, that is, perpendicular to the layer surface of the waveguide 35. The setting these polarizations enables the waveguide light 53d propagating through the waveguide 35 to be coupled with the surface plasmon antenna 36 in a surface plasmon mode.

Returning to FIG. 6, the near-field light generating end surface 36a of the surface plasmon antenna 36 is located close to the end surface 3400e of the main magnetic pole 3400 reaching the head end surface 388. And the propagation edge 360 extends to the near-field light generating end surface 36a. Further, in the present embodiment, a portion of the propagation edge 360 on the end surface 36a side (on the head end surface 388 side) has a shape of straight line or curved line extending so as to become closer to the end surface 361 of the surface plasmon antenna 36 as going toward the near-field light generating end surface 36a, the end surface 361 being opposite to the propagation edge 360. Surface plasmon 60 excited on the propagation edge 360 propagates on the propagation edge 360 along the direction shown by arrows 61. The propagation of the surface plasmon 60 can occur under the condition that the propagation edge 360 of the surface plasmon antenna 36 is covered with a buffering portion 50 having a refractive index $n_{BF}$ equal to or higher than the refractive index $n_{IN}$ of a material layer 51 covering the end surface 361 on the opposite side to the edge 360. The propagation edge 360 can be made rounded to prevent surface plasmon from running off from the edge 360, and thus to prevent the degradation of light use efficiency. The curvature radius of the rounded edge is preferably in the range of 6.25 to 20 nm. The preferable curvature radius enables near-field light 62 with an intensity of electric field sufficient for realizing a satisfactory thermally-assisted magnetic recording to be generated from the near-field light generating end surface 36a.

According also to FIG. 6, in the present embodiment, the surface plasmon antenna 36 tapers in the height direction (Z-axis direction) near the head end surface 388 toward the near-field light generating end surface 36a. Further, the surface plasmon antenna 36 has, in the present embodiment, a cross-section taken by YZ plane with a triangular shape, especially, has a predetermined triangular shape in the vicinity of the head end surface 388. As a result, in the present embodiment, the near-field light generating end surface 36a has a triangular shape (FIG. 7) in which one apex is the end of the propagation edge 360. Thus, surface plasmon 60 propagating on the propagation edge 360 reaches the near-field light generating end surface 36a having an apex 360a as a destination of the edge 360. As a result, the surface plasmon 60, namely, electric field converges in the near-field light generating end surface 36a. Therefore, near-field light 62 is emitted from the end surface 36a toward the magnetic recording layer of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be achieved.

Meanwhile, in a conventional case in which a plasmon antenna provided on the end surface of a head is directly irradiated with laser light propagating through the waveguide without using a surface plasmon antenna, most of the irradiated laser light has been converted into thermal energy within the plasmon antenna. As a result, the plasmon antenna has been brought to a very high temperature, for example, 500° C. (degrees Celsius). On the contrary, in the thermally-assisted magnetic recording with the surface plasmon antenna 36 according to the present invention, a surface plasmon mode is utilized, and near-field light 62 is generated by propagating surface plasmon 60 toward the head end surface 388. This brings the temperature at the near-field light generating end surface 36a to, for example, about 100° C. during the emission of near-field light, which is greatly reduced compared to the conventional. This reduction of temperature allows the protrusion of the near-field light generating end surface 36a toward the magnetic disk 10 to be suppressed; thereby favorable thermally-assisted magnetic recording can be achieved.

Furthermore, the length $L_{BF}$ of the whole buffering portion 50, that is, the portion through which the waveguide 35 and the surface plasmon antenna 36 are coupled with each other in a surface plasmon mode, is preferably larger than the wavelength $\lambda_L$ of the laser light. In this preferable case, the coupling portion has an area markedly larger than a so-called "focal region" in the case that, for example, laser light is converged on a buffering portion and a surface plasmon antenna and coupled in a surface plasmon mode. Therefore, a configuration quite different from the system including such "focal region" can be realized in the present invention; thus, very stable coupling in the surface plasmon mode can be achieved. The induction of surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. Nos. 7,330,404 B2, and 7,454,095 B2.

Referring also to FIG. 6, the waveguide 35 and the buffering portion 50 are provided on −Z side (on the leading side), that is, on the opposite side to the main magnetic pole 3400 in relation to the surface plasmon antenna 36. As a result, the propagation edge 360 is also positioned on the opposite side to the main magnetic pole 3400 within the surface plasmon antenna 36. By applying such a configuration, even when a distance between the end surface 3400e generating write field of the main magnetic pole 3400 and the end surface 36a emitting near-field light is sufficiently small, preferably 100 nm or less, the waveguide 35 can be separated sufficiently apart from the main magnetic pole 3400. As a result, there can be avoided a situation in which a part of the waveguide light 53 is absorbed into the main magnetic pole 3400 made of metal and the amount of light to be converted into near-field light is reduced.

Further, the waveguide 35 can have a constant width in the track width direction (Y-axis direction); however, as shown in FIG. 6, the waveguide 35 can have a portion on the head end surface 388 side which has a narrower width in the track width direction (Y-axis direction). The width $W_{WG2}$ in the track width direction (Y-axis direction) of a portion of the waveguide 35 near the end surface 350 on the head end surface 388 side may be, for example, in the range approximately from 0.3 to 0.7 μm. Further, the thickness T (in Z-axis direction) of the waveguide 35 may be, for example, in the range approximately from 0.3 to 0.7 μm, and the height (length) $H_{WG}$ (in X-axis direction) may be, for example, in the range approximately from 10 to 300 μm.

Further, the side surfaces of the waveguide 35: the upper surface 354, the lower surface 353, and both the side surfaces 351 in the track width direction (Y-axis direction) have a surface contact with the overcoat layer 38 (FIG. 2), that is, the insulating layers 384 and 385 (FIG. 3), except a portion having a surface contact with the buffering portion 50. Here, the waveguide 35 is formed of a material with a refractive index n higher than the refractive index $n_{OC}$ of the constituent material of the overcoat layer 38, made by using, for example, a sputtering method. For example, in the case that the wavelength $\lambda_L$ of the laser light is 600 nm and the overcoat layer 38 is formed of $SiO_2$ (silicon dioxide: n=1.5), the waveguide 35 can be formed of, for example, $Al_2O_3$ (alumina: n=1.63). Further, in the case that the overcoat layer 38 is formed of $Al_2O_3$ (n=1.63), the waveguide 35 can be formed of, for example, $SiO_xN_Y$ (n=1.7-1.85), $Ta_2O_5$ (n=2.16), $Nb_2O_5$ (n=2.33), TiO (n=2.3-2.55) or $TiO_2$ (n=2.3-2.55). The just-described material structure of the waveguide 35 enables the propagation loss of laser light 53d to be reduced due to the excellent optical characteristics of the constituent material. Further, the waveguide 35 acting as a core can provide the total reflection in all the side surfaces of the waveguide 35 due to the existence of the overcoat layer 38 acting as a clad. As a result, more amount of laser light 53d can reach the position of the buffering portion 50, which improves the propagation efficiency of the waveguide 35. In the present embodiment, a portion of the propagation edge 360 which is not opposed to the waveguide 35 (buffering portion 50) may be covered with a constituent material of the overcoat layer 38 having a refractive index $n_{OC}$, for example, a portion 3850 of the insulating layer 385.

Furthermore, alternatively, the waveguide 35 may have a multilayered structure of dielectric materials in which the upper a layer is, the higher becomes the refractive index n of the layer. The multilayered structure can be realized, for example, by sequentially stacking dielectric materials of $SiO_xN_Y$ with the composition ratios X and Y appropriately changed. The number of stacked layers may be, for example, in the range from 8 to 12. In the case that laser light 53d has a linear polarization in Z-axis direction, the above-described structure enables the laser light 53d to propagate along the course closer to the buffering portion 50. In this case, by choosing the composition and layer thickness in each layer, and the number of layers of the multilayered structure, the laser light 53d can propagate through the desired positions in Z-axis direction.

The surface plasmon antenna 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon antenna 36 can have a width $W_{NF}$ in the track width direction (Y-axis direction) of the upper surface 361, the width $W_{NF}$ being sufficiently smaller than the wavelength of the laser light 53d, and being in the range of, for example, approximately 10 to 100 nm. And the surface plasmon antenna 36 can have a thickness $T_{NF1}$ (in Z-axis direction) sufficiently smaller than the wavelength of the laser light 53d, the thickness $T_{NF1}$ being in the range of, for example, approximately 10 to 100 nm. Further, the length (height) $H_{NF}$ (in X-axis direction) can be set to be in the range of, for example, approximately 0.8 to 6.0 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 600 nm and the waveguide 35 is formed of $Al_2O_3$ (alumina: n=1.63), the buffering portion 50 can be formed of $SiO_2$ (silicon dioxide: n=1.46). Further, when the waveguide 35 is formed of $Ta_2O_5$ (n=2.16), the buffering portion 50 can be formed of $SiO_2$ (n=1.46) or $Al_2O_3$ (n=1.63). In these cases, the buffering portion 50 can be a portion of the overcoat layer 38 (FIG. 2) serving as a clad made of $SiO_2$ (n=1.46) or $Al_2O_3$ (n=1.63). Further, the length $L_{BF}$ (in X-axis direction) of the buffering portion 50, namely, the length of a portion sandwiched between the side surface 354 of the waveguide 35 and the propagation edge 360, is preferably in the range of 0.5 to 5 μm, and is preferably larger than the wavelength $\lambda_L$ of the laser light 53d. In this preferable case, the portion has an area markedly larger than a so-called "focal region" in the case that, for example, laser light is converged on a buffering portion 50 and a surface plasmon antenna 36 and coupled in a surface plasmon mode. As a result, the portion enables very stable coupling in a surface plasmon mode. Further, the thickness $T_{BF}$ (in Z-axis direction) of the buffering portion 50 is preferably in the range of 10 to 200 nm. These length $L_{BF}$ and thickness $T_{BF}$ of the buffering portion 50 are important parameters for obtaining proper excitation and propagation of surface plasmon.

Also as shown in FIG. 6, a thermal conduction layer 51 is preferably provided on the head end surface 388 side between the surface plasmon antenna 36 and the first main pole portion 3400a. The thermal conduction layer 51 is formed of, for example, an insulating material such as AlN, SiC or DLC, which has higher thermal conductivity compared with that of the overcoat layer 38. Providing the thermal conduction layer 51 allows a part of the heat generated when the surface plasmon antenna 36 emits near-field light to get away to the main magnetic pole 3400 through the thermal conduction layer 51. That is, the main magnetic pole 3400 can be utilized as a heatsink. As a result, excessive temperature rise of the surface plasmon antenna 36 can be suppressed, and there can be avoided unwanted protrusion of the near-field light generating end surface 36a and substantial reduction in the light use efficiency of the surface plasmon antenna 36.

The thickness $T_{TC}$ of the thermal conduction layer 51 corresponds to a distance $D_{N-P}$ (FIG. 7) on the head end surface 388 between the near-field light generating end surface 36a and the end surface 3400e of the main magnetic pole 3400, and is preferably set to be a sufficiently small value of 100 nm or less. Further, the refractive index $n_{IN}$ of the thermal conduction layer 51 is set equal to or lower than the refractive index $n_{BF}$ of the buffering portion 50 that covers the propagation edge 360 of the surface plasmon antenna 36. That is, the propagation edge 360 of the surface plasmon antenna 36 is covered with a material having a refractive index $n_{BF}$ equal to or higher than the refractive index $n_{IN}$ of a material covering the end surface 361 opposite to the edge 360. This allows surface plasmon to propagate stably on the propagation edge 360.

As shown also in FIG. 6, the main magnetic pole 3400 includes; the first main pole portion 3400a having the end surface 3400e reaching the head end surface 388; and the second main pole portion 3400b, the end portion on the head end surface 388 side of which is stacked on and overlapped with a portion of the first main pole portion 3400a on the opposite side to the head end surface 388. Further, the end portion of the upper yoke layer 340 on the head end surface 388 side is stacked on and overlapped with a portion of the second main pole portion 3400b on the opposite side to the head end surface 388. Namely, the upper yoke layer 340 and the main magnetic pole 3400 are formed in such a way as to become closer to the near-field light generating end surface 36a of the surface plasmon antenna 36 when going toward the head end surface 388. As a result, the end surface 3400e of the main magnetic pole 3400 can be made sufficiently close to the near-field light generating end surface 36a, under the condition that the upper yoke layer 340 and the main magnetic pole 3400 are at a sufficiently large distance from the waveguide 35.

Figure 7:
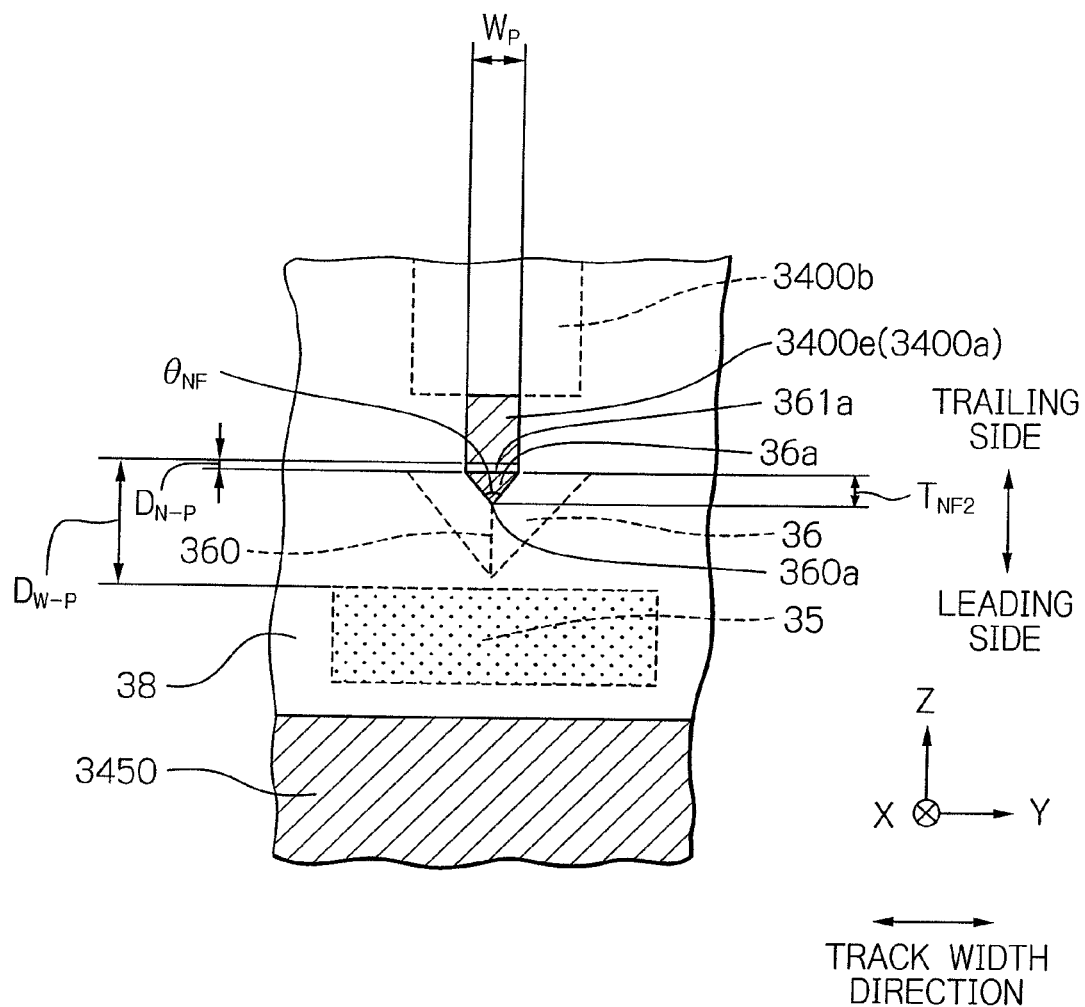
FIG. 7 shows a plan view illustrating the shapes of the end surfaces of the surface plasmon antenna and the electromagnetic transducer on the head end surface or in its vicinity.

FIG. 7 shows a plan view illustrating the shapes of the end surfaces of the surface plasmon antenna 36 and the electromagnetic transducer 34 on the head end surface 388 or in its vicinity.

As shown in FIG. 7, the main magnetic pole 3400 (the first main pole portion 3400a) and the lower shield 3450 of the electromagnetic transducer 34 reach the head end surface 388. The shape of the end surface 3400e of the main magnetic pole 3400 on the head end surface 388 is, for example, a rectangle, a square or a trapezoid. Here, the above-described width $W_P$ is a length of the edge along the track width direction (Y-axis direction) of the end surface 3400e of the main magnetic pole 3400, and provides the width of a track formed on the magnetic recording layer of the magnetic disk in the magnetically dominant recording case. The width $W_P$ is in the range of, for example, approximately 0.05 to 0.5 μm.

Moreover, on the head end surface 388, the near-field light generating end surface 36a of the surface plasmon antenna 36 is positioned close to the end surface 3400e of the main magnetic pole 3400, on the leading side (−Z side) of the end surface 3400e, and on the trailing side (+Z side) of the lower shield 3450. Here, a distance $D_{N-P}$ between the near-field light generating end surface 36a and the end surface 3400e is set to be a sufficiently small value of, for example, 100 nm or less. In the thermally-assisted magnetic recording, the near-field light generating end surface 36a functions as a main heating action part, and the end surface 3400e functions as a writing action part. Therefore, by setting the distance $D_{N-P}$ as described above, write field with a sufficiently large gradient can be applied to a portion of the magnetic recording layer of the magnetic disk, the portion having been sufficiently heated. This enables a stable thermally-assisted write operation to be securely achieved. Further, according to the configuration shown in FIG. 6, a distance $D_{W-P}$ between the waveguide 35 and the main magnetic pole 3400 is made sufficiently large while the distance $D_{N-P}$ is set to a minute value as described above. That is, the waveguide 35 can be positioned sufficiently away apart from the main magnetic pole 3400. As a result, there can be avoided a situation in which a part of the laser light is absorbed into the main magnetic pole 3400 made of metal, and the amount of light to be converted into near-field light is reduced.

Furthermore, in the present embodiment, the near-field light generating end surface 36a has a shape of isosceles triangle on the head end surface 388, which has a bottom edge 361a on the trailing side (+Z side) and an apex on the leading side (−Z side) that is an end 360a of the propagation edge 360. The height $T_{NF2}$ of the near-field light generating end surface 36a is preferably 30 nm or less, and is more preferably 20 nm or less. Thereby, the near-field-light emitting position on the end surface 36a becomes close to the edge 361a on the trailing side, that is, closer to the end surface 3400e of the main magnetic pole 3400. Further, the apex angle $\theta_{NF}$ of the apex 360a of the isosceles triangle is preferably in the range of 60 to 130 degrees.

FIGS. 8a to 8e show schematic diagrams illustrating various embodiments regarding components of the thermally-assisted magnetic recording head according to the present invention.

Figure 8A:
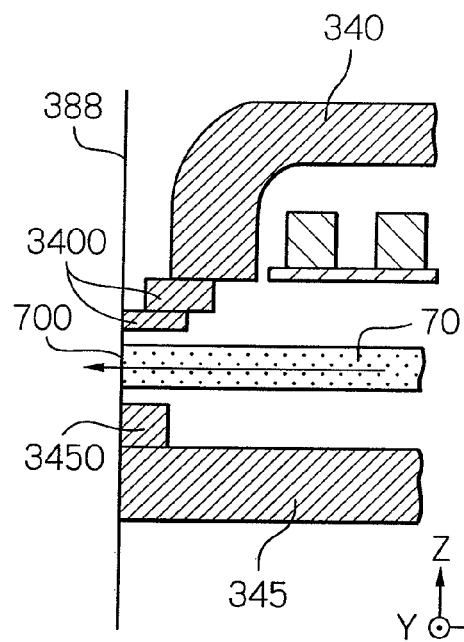
FIGS. 8a to 8e show schematic diagrams illustrating various embodiments regarding components of the thermally-assisted magnetic recording head according to the present invention.

In the embodiment shown in FIG. 8a, the configuration in the electromagnetic transducer including such as the upper yoke layer 340, the main magnetic pole 3400 and the lower shield 3450 is the same as that shown in FIG. 3. However, there is not provided a surface plasmon antenna for generating near-field light. Instead of that, the end surface 700 of a waveguide 70 reaches the head end surface 388, and the laser light generated from the laser diode 40 is emitted from the end surface 700 through the binary lens 42, the reflecting mirror 43, the spot-size converter 44 and the waveguide 35. The emitted light performs the heating of the magnetic recording layer of the magnetic disk and thus the thermal assist. Utilizing this optical system enables the thermally-assisted magnetic recording with use of the surface-emitting laser diode 40 provided in the element-integration surface 2102.

Figure 8B:
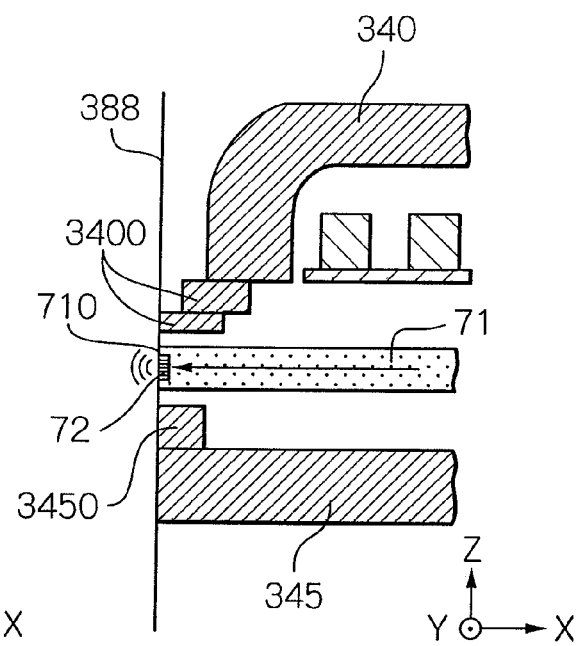

In the embodiment shown in FIG. 8b, a plasmon antenna 72 formed of a metal piece is added into the configuration shown in FIG. 8a. The plasmon antenna 72 is disposed at the end surface 710 of a waveguide 71 so as to be exposed in the head end surface 388. When the end of the plasmon antenna 72 opposite to the exposed end surface is irradiated with the waveguide light that has propagated through the waveguide 71, the plasmon antenna 72 emits near-field light from the exposed end surface toward the magnetic disk. The near-field light performs the heating of the magnetic recording layer of the magnetic disk and thus the thermal assist. Utilizing this optical system also enables the thermally-assisted magnetic recording with use of the surface-emitting laser diode 40 provided in the element-integration surface 2102.

Figure 8C:
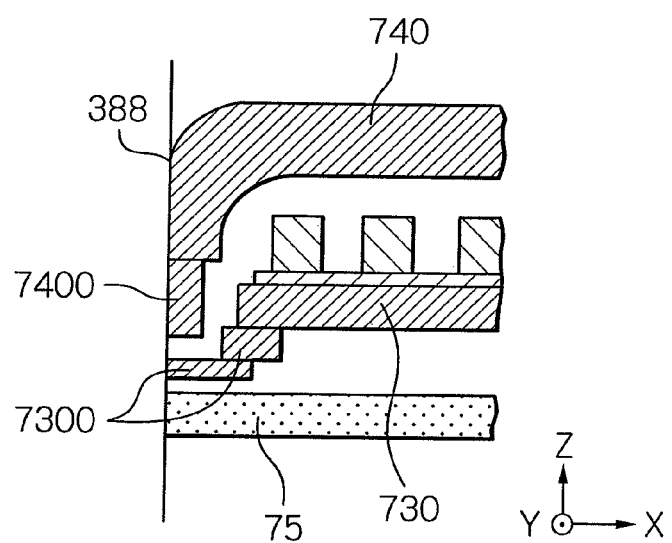

In the embodiment shown in FIG. 8c, a main magnetic pole 7300 and a yoke layer 730 are provided on the trailing side (−Z side) of the waveguide 35, and a trailing shield 7400 and a yoke layer 740 are disposed on the trailing side (−Z side) of the main magnetic pole 7300. That is, in the present embodiment, the positional relationship in the stacking direction (Z-axis direction) between the main magnetic pole with the yoke layer coupled to the pole and the shield with the yoke layer coupled to the shield is reverse to that of the electromagnetic transducer 34 shown in FIG. 3. Further, whereas the waveguide 35 in the embodiment shown in FIG. 3 extends between both yoke layers, the waveguide 75 in the present embodiment is disposed on the leading side from both yoke layers. Alternatively, a surface plasmon antenna may be provided on the head end surface 388 side of the waveguide 75 as in the embodiment shown in FIG. 3, or there may be provided a plasmon antenna as in the embodiment shown in FIG. 8b. By utilizing these optical systems and electromagnetic transducers, the thermal-assisted magnetic recording can also be performed with use of the surface-emitting laser diode 40 provided in the element-integration surface 2102.

Figure 8D:
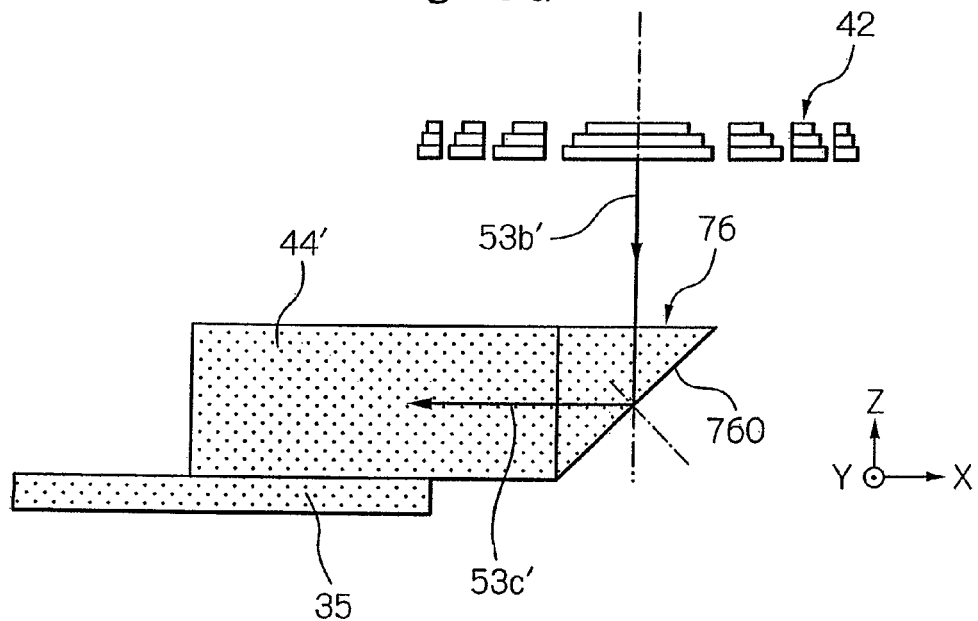

In the embodiment shown in FIG. 8d, a prism 76 is provided as a light-path changer, instead of the reflecting mirror 43 in the near-field light generating optical system of the embodiment shown in FIG. 3. The prism 76 reflects totally a laser light 53b' converged by the binary lens 42 on the prism plane 760. The totally-reflected laser light 53c' is directed toward the spot-size converter 44'. The prism 76 is formed of a material having a larger refractive index than that of the surrounding overcoat layer 38, and further, its optical condition is set in such a way that the critical angle of the reflection at the prism plane 760 is equal to or less than the incident angle (45° in FIG. 8d) of the laser light 53b' at the prism plane 760.

Figure 8E:
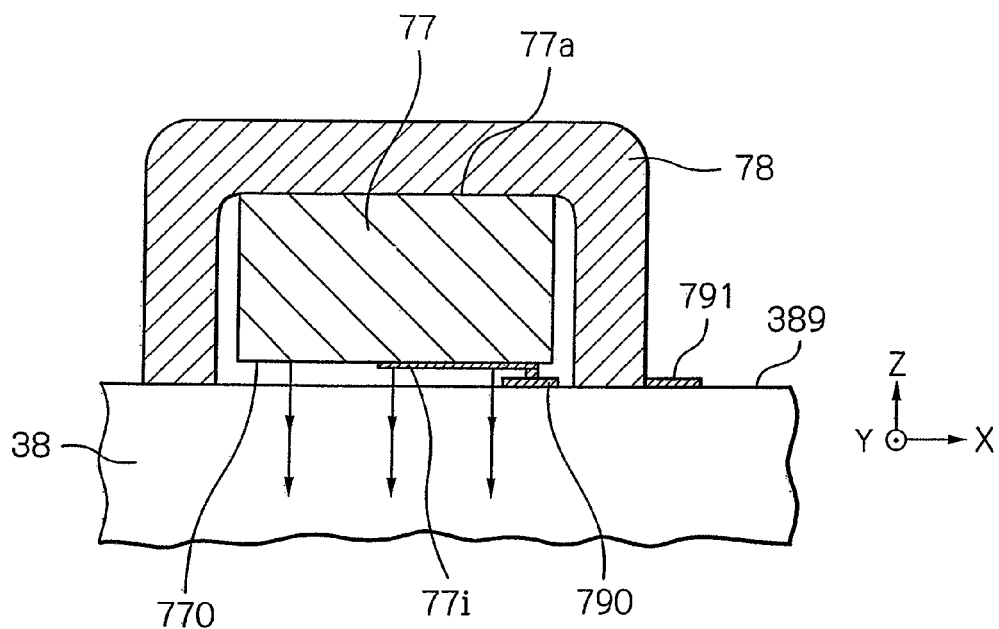

In the embodiment shown in FIG. 8e, a photonic-crystal type surface-emitting laser diode 77 is fixed on a holder 78 in such a way that an n-electrode 77a of the diode 77 is electrically connected with the holder 78. The holder 78 is formed of a metal with high thermal conductivity such as Cu. The emitting surface 770 of the laser diode 77 is opposed to the upper surface 389 of the overcoat layer 38 with a predetermined distance (or with a surface contact to each other). Further, provided are a terminal electrode 790 electrically connected with a p-electrode 77j positioned on the light-emitting surface 770 and a terminal electrode 791 electrically connected with the holder 78. The laser diode 77 can operate by applying a predetermined voltage between these terminal electrodes 790 and 791. In the present embodiment, the holder 78 functions as a heatsink as well as a conduction path for applying the voltage to the laser diode 77. The sufficient heat-dissipation during the operation of the laser diode 77 with use of the holder 78 enables the light-emitting operation of the laser diode 77 to be more stable.

Other various embodiments are possible than the embodiments shown in FIGS. 8a to 8e. Actually, various types of thermally-assisted magnetic recording heads can be provided by utilizing the configuration according to the present invention, in which a laser light emitted from the light-emitting surface of a laser diode that comprises a photonic-band layer is adjusted by using a diffraction optical element and a light-path changer, and then is guided into a waveguide.

Figure 9A:
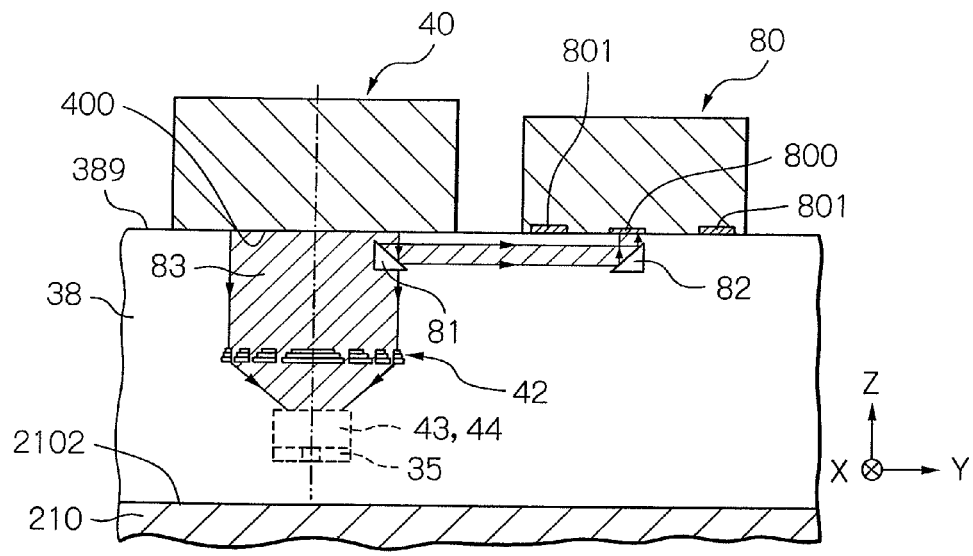
FIG. 9a shows a cross-sectional view illustrating another embodiment that includes a light detector for controlling light output power in the thermally-assisted magnetic recording head according to the present invention.
Figure 9B:
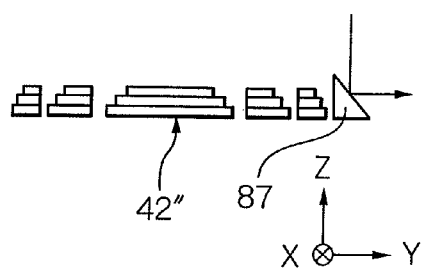
FIG. 9b shows a schematic view illustrating an alternative of binary lens in the embodiment including a light detector for controlling light output power.
Figure 9C:
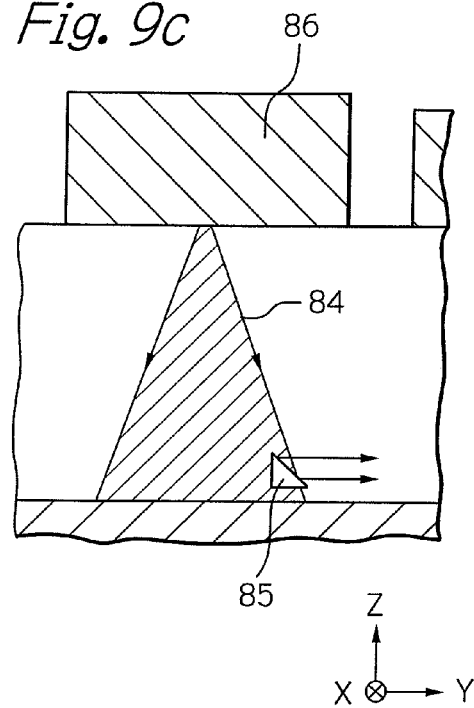
FIG. 9c shows a schematic view illustrating a comparative example that includes a light detector for controlling light output power.

FIG. 9a shows a cross-sectional view illustrating another embodiment that includes a light detector for controlling light output power in the thermally-assisted magnetic recording head according to the present invention. And FIG. 9b shows a schematic view illustrating an alternative of binary lens in the embodiment including a light detector for controlling light output power. Further, FIG. 9c shows a schematic view illustrating a comparative example that includes a light detector for controlling light output power.

According to the embodiment of FIG. 9a, a near-field light generating optical system is provided in the element-integration surface 2102, which includes a laser diode 40, a binary lens 42, and so on, as the embodiment shown in FIG. 3. Laser light 83 emitted from the light-emitting surface 400 of the laser diode 40 propagates through the binary lens 42 and so on to be used for thermal assist, also as in the embodiment shown in FIG. 3. However, in the present embodiment, a photodiode 80 is provided on the upper surface 389 of the overcoat layer 38 as well as the laser diode 40 is. The photodiode 80 is a light detector that measures the intensity of a light emitted from the laser diode 40 in order to adjust the light output power of the laser diode 40. Alternatively, other optical sensors such as a photo-resistor can be used as the light detector, instead of the photodiode 80.

Furthermore, a reflecting mirror 81 is provided as a detective light-path changer in the midway of the light-path of laser light 83 emitted from the light-emitting surface 400. A part of the laser light 83 is changed in its path direction by the reflecting mirror 81, and reaches a light-receiving window 820 of the photodiode 80 through a reflecting mirror 82 as another detective light-path changer provided down below the photodiode 80. The photodiode 80 detects the part of the laser light 83 as a monitor light, measures its light intensity, and then outputs the measuring result. Alternatively, a prism can be used as a detective light-path changer, instead of the reflecting mirror 81 and/or the reflecting mirror 82.

Generally, a laser diode is a semiconductor element; thus, the intensity of the outputted laser light varies under the change in use environment temperature, or the change in temperature due to the heat generated from the laser diode. Therefore, especially in the configuration in which a laser diode is mounted directly in the slider substrate of a head, it becomes a significant problem to hold the intensity of (near-field) light used for thermal assist constant, in response to the actual temperature during driving the head, thereby to stabilize the recording performance. As a countermeasure against the problem, in the present embodiment, the output power of the light emitted from the laser diode 40 is continuously measured and monitored by using the photodiode 80, which enables the feedback control of the light output power. By performing the control, it becomes possible to suppress the variation due to temperature change and further over time in light output power of the laser diode 40, thereby to stabilize the intensity of (near-field) light with which the magnetic recording layer of the magnetic disk is irradiated. As a result, there can be ensured the appropriate heating of the magnetic recording layer.

As shown in FIG. 9b, alternatively, a binary lens 42" can be used instead of the binary lens 42 and the reflecting mirror 81, a part of the binary lens 42" acting as a detective light-path changer. The part 87 of the binary lens 42" is a reflecting mirror (or prism), and a part of the laser light emitted from the light-emitting surface 400 of the laser diode 40 can be directed toward the reflecting mirror 82 by being reflected at the part 87. Using such a binary lens 42" can reduce the number of optical components.

Returning to FIG. 9a, the reflecting mirrors 81 and 82 can be provided, in the stacking direction (Z-axis direction), near the laser diode 40 and the photodiode 80, respectively. Further, the reflecting mirrors 81 and 82 can be set to be as close to each other as possible within the bounds of not bringing about obstacles in fixing the laser diode 40 and the photodiode 80 onto the upper surface 389. Actually, the laser light 83 emitted from the light-emitting surface 400 of the laser diode 40 remains an almost-collimated (almost-parallel) light with a large cross-section, from the beginning of the emission. Therefore, it becomes easy to take out a part of the laser light 83 immediately after the emission without significant loss of the amount of light to be used for thermal assist. As a result, the light path of monitor light from the laser diode 40 to the photodiode 80 can be made sufficiently short, which enables a reliable feedback control by detecting the monitor light with a sufficient intensity. On the contrary, as a comparative example shown in FIG. 9c, in the case of using a surface-emitting laser diode 86 such as a VCSEL for a light source, the size of the beam spot near the emitting point is extremely small, for example, in the range of approximately 0.5 to 5.0 μm. Therefore, a reflecting mirror 85 for taking out a part of the emitted laser light 84 has to be disposed in a position where the laser light 84 is diverged to a considerable degree in order not to lose a significant amount of light to be used for thermal assist. As a result, the reflecting mirror 85 is required to be at a considerable distance in the stacking direction (Z-axis direction) from the laser diode 86. Therefore, the light path of monitor light inevitably becomes significantly long compared with the present embodiment (FIG. 9a) with use of the photonic-crystal type surface-emitting laser diode 40.

In FIG. 9a, the photodiode 80 is positioned apart away in +Y direction from the laser diode 40. However, alternatively, the photodiode 80 may be provided apart away in other direction from the laser diode 40 by disposing detective light-path changers appropriately. Further, the laser diode 40 and the photodiode 80 may be integrated as a single element, and then provided on the upper surface 389 of the overcoat layer 38.

Figure 10:
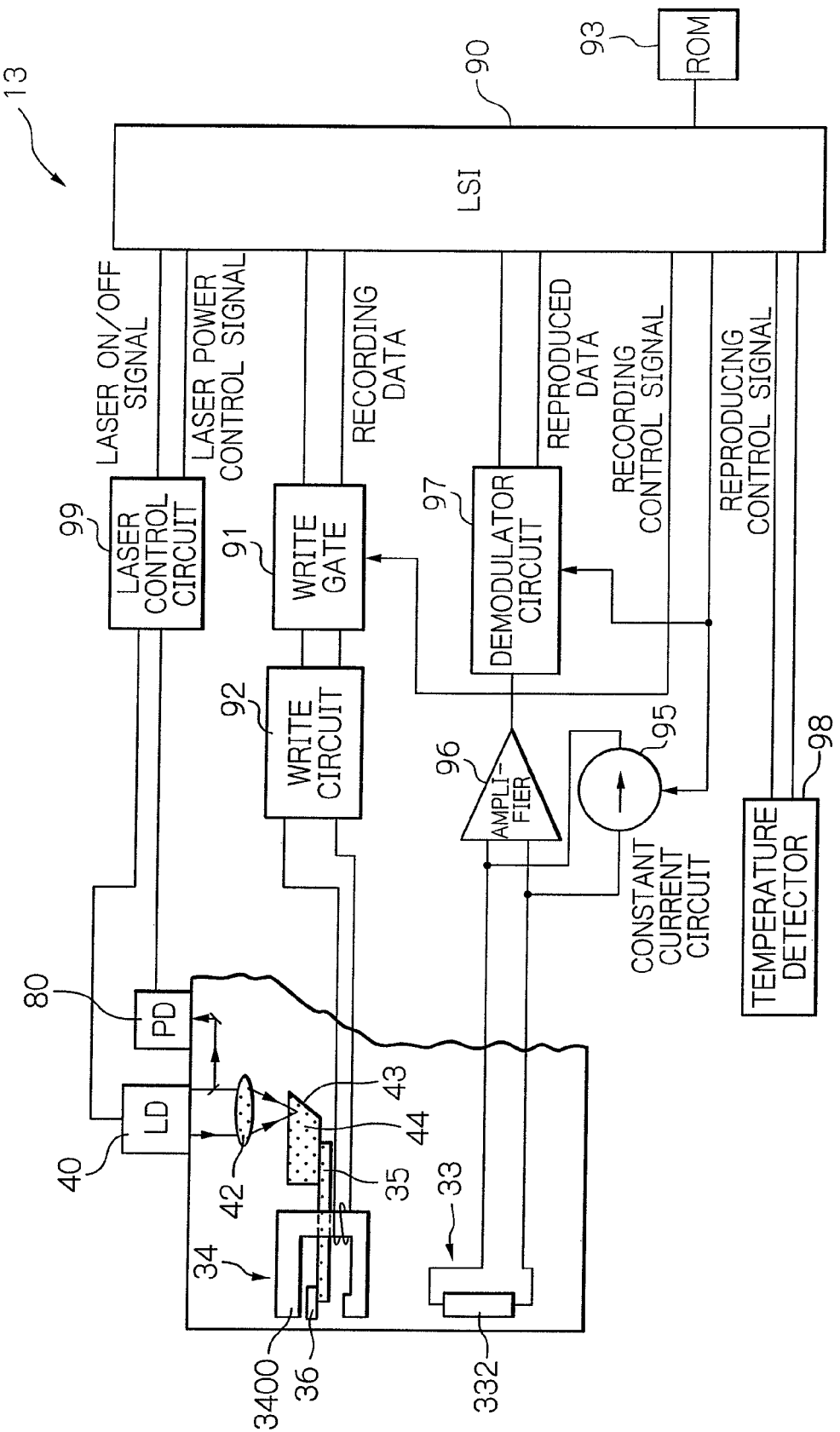
FIG. 10 shows a block diagram illustrating the circuit structure of the recording/reproducing and light-emission control circuit of the magnetic disk apparatus shown in FIG. 1.

FIG. 10 shows a block diagram illustrating the circuit structure of the recording/reproducing and light-emission control circuit 13 of the magnetic disk apparatus shown in FIG. 1. In the embodiment shown in this figure, the target to be controlled is the head, as shown in FIG. 9a, capable of performing the feedback adjustment for the light output power of the laser diode 40.

According to FIG. 10, reference numeral 90 indicates a control LSI, 91 indicates a write gate for receiving recording data from the control LSI 90, 92 indicates a write circuit, 93 indicates a ROM that stores a control table or the like for controlling the value of drive current supplied to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk with write field generated from the main magnetic pole 3400. Further, a constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

The laser control circuit 99 receives a laser ON/OFF signal and a laser power control signal, which are outputted from the control LSI 90. When the laser ON/OFF signal indicates an ON operation instruction, a drive current with an oscillation threshold value or more is applied into the laser diode 40. Thereby, the laser diode 40 emits light; then the laser light goes through the binary lens 42, the reflecting mirror 43 and the spot-size converter 44, and propagates through the waveguide 35, and then couples with the surface plasmon antenna 36 in a surface plasmon mode. As a result, near-field light is generated from the end of the surface plasmon antenna 36, and then the magnetic recording layer of the magnetic disk is irradiated and heated with the near-field light. The value of the drive current in this occasion is controlled to such a value that the laser diode 40 emits a laser light whose output is specified by the laser power control signal.

The control LSI 90 generates the laser ON/OFF signal, adjusting the timing of the signal generation according to recording/reproducing operations, and determines the value of the laser power control signal by referring the value of temperature in the magnetic recording layer of the magnetic disk or the like, which is measured by the temperature detector 98, based on the control table in the ROM 93. Here, the control table may include data about the relation between the drive current value and the mount of temperature increase due to thermal-assist operation in the magnetic recording layer, and data about the temperature dependence of the anisotropic magnetic field (coercive force) of the magnetic recording layer, as well as data about the temperature dependences of the oscillation threshold value and the characteristics of light output power vs. drive current. Thus, by providing the system of the laser ON/OFF signal and the laser power control signal independently from the recording/reproducing control signal system, it becomes possible to realize not only a current supply to the laser diode 40 linked simply with the recording operation but also more diversified current supply modes. Further, the photodiode 80 measures and monitors the output power of light emitted from the laser diode 40, and sends the measured values to the laser control circuit 99. The laser control circuit 99 performs the feedback adjustment with use of the measured values, and adjusts the drive current applied to the laser diode 40 in such a way that the laser diode 40 emits a laser light with an output power that is specified by the laser power control signal.

Obviously, the circuit structure of the recording/reproducing and light-emission control circuit 13 is not limited to that shown in FIG. 10. It is also possible to specify write and read operations by using signals other than the recording control signal and reproducing control signal.

As described above, according to the present invention, there is provided a thermally-assisted magnetic recording head in which a light source having a sufficiently high output power is disposed in the element-integration surface of the slider substrate to achieve improvement of mass-productivity. Further, it becomes possible to guide light efficiently into a desired position on the opposed-to-medium surface side by using optical elements that are hardly affected adversely by the change of surrounding temperature. Furthermore, a thermally-assisted magnetic recording head is provided, in which there is disposed, in the element-integration surface, a light source capable of emitting a light that is suitable for transforming the light into a light beam with a minute spot size, or is suitable for monitoring the output power of the light. Thus, the present invention can perform a satisfactory thermally-assisted magnetic recording, and contribute to the achievement of higher recording density, for example, exceeding 1 Tbits/in$^2$.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
    a light source provided in an element-integration surface of a substrate, and having a multilayered structure including a photonic-band layer having a periodic structure in which a light generated from an active region resonates, and the light source having a light-emitting surface that is a layer surface as an end surface of the multilayered structure and is opposed to the element-integration surface;
    a diffraction optical element that converges a light emitted from the light-emitting surface;
    a light-path changer that changes a propagation direction of the converged light;
    a waveguide that propagates the light, whose propagation direction is changed by the light-path changer, toward an opposed-to-medium surface;
    a magnetic pole that generates write field from its end surface on the opposed-to-medium surface side, provided in the element-integration surface of the substrate, and
    a spot-size converter that converts a spot size of the light whose propagation direction is changed by the light-path changer.

2. The thermally-assisted magnetic recording head as claimed in claim 1, wherein a spot diameter of a light that is entering the spot-size converter is in a range from two to twenty times larger than a spot diameter of the light that has just entered the waveguide.

3. The thermally-assisted magnetic recording head as claimed in claim 2, wherein the spot diameter of the light that is entering the spot-size converter is 1 micrometer or more, and is 10 micrometers or less.

4. A thermally-assisted magnetic recording head comprising:
    a light source provided in an element-integration surface of a substrate and having a multilayered structure including a photonic-band layer having a periodic structure in which a light generated from an active region resonates, and the light source having a light-emitting surface that is a layer surface as an end surface of the multilayered structure and is opposed to the element-integration surface;
    a diffraction optical element that converges a light emitted from the light-emitting surface;
    a light-path changer that changes a propagation direction of the converged light;
    a waveguide that propagates the light, whose propagation direction is changed by the light-path changer, toward an opposed-to-medium surface; and
    a magnetic pole that generates write field from its end surface on the opposed-to-medium surface side, provided in the element-integration surface of the substrate,
    wherein the diffraction optical element is a binary lens.

5. A thermally-assisted magnetic recording head comprising:
    a light source provided in an element-integration surface of a substrate, and having a multilayered structure including a photonic-band layer having a periodic structure in which a light generated from an active region resonates, and the light source having a light-emitting surface that is a layer surface as an end surface of the multilayered structure and is opposed to the element-integration surface;
    a diffraction optical element that converges a light emitted from the light-emitting surface;
    a light-path changer that changes a propagation direction of the converged light;
    a waveguide that propagates the light, whose propagation direction is changed by the light-path changer, toward an opposed-to-medium surface; and
    a magnetic pole that generates write field from its end surface on the opposed-to-medium surface side, provided in the element-integration surface of the substrate,
    wherein the diffraction optical element is a binary lens, and
    wherein a two-dimensional periodic plane of the periodic structure that the photonic-band layer has and a lens plane perpendicular to an optical axis of the diffraction optical element are parallel to the element-integration surface of the substrate.

6. The thermally-assisted magnetic recording head as claimed in claim 1, wherein the light-path changer is a reflecting mirror that reflect the converged light.

7. The thermally-assisted magnetic recording head as claimed in claim 1, wherein further provided are a light detector that measures an output power of the light source in order to adjust the output power and at least one detective light-path changer that directs a part of light propagating between the light-emitting surface of the light source and the diffraction optical element toward the light detector.

8. The thermally-assisted magnetic recording head as claimed in claim 7, wherein the light source and the light detector are provided on an overcoat layer formed on the element-integration surface of the substrate.

9. A head gimbal assembly comprising a thermally-assisted magnetic recording head as claimed in claim 1 and a suspension that supports the thermally-assisted magnetic recording head.

10. A magnetic recording apparatus comprising:
    at least one head gimbal assembly comprising the thermally-assisted magnetic recording head as claimed in claim 1 and a suspension that supports the thermally-assisted magnetic recording head; at least one magnetic recording medium; and a recording control circuit that controls write operations that the thermally-assisted magnetic recording head performs to the at least one magnetic recording medium, the recording control circuit further including a light-emission control circuit that controls light-emission operations of the light source.

11. The magnetic recording apparatus as claimed in claim 10, wherein the thermally-assisted magnetic recording head further comprises: a light detector that measures an output power of the light source in order to adjust the output power; and at least one detective light-path changer that directs a part of light propagating between the light-emitting surface of the light source and the diffraction optical element toward the light detector, and wherein the light-emission control circuit controls the light-emission operations of the light source by using an output of the light detector.

12. The magnetic recording apparatus as claimed in claim 11, wherein the light source and the light detector are provided on an overcoat layer formed on the element-integration surface of the substrate.

13. The thermally-assisted magnetic recording head as claimed in claim 4, wherein the light-path changer is a reflecting mirror that reflect the converged light.

14. The thermally-assisted magnetic recording head as claimed in claim 4, wherein further provided a light detector that measures an output power of the light source in order to adjust the output power and at least one detective light-path changer hat directs a part of light propagating between the light-emitting surface of the light source and the diffraction optical element toward the light detector.

15. The thermally-assisted magnetic recording head as claimed in claim 14, wherein the light source and the light detector are provided on an overcoat layer formed on the element-integration surface of the substrate.

16. A head gimbal assembly comprising the thermally-assisted magnetic recording head as claimed in claim 4 and a suspension that supports the thermally-assisted magnetic recording head.

17. A magnetic recording apparatus comprising: at least one head gimbal assembly comprising the thermally-assisted magnetic recording head as claimed in claim 4 and a suspension that supports the thermally-assisted magnetic recording head; at least one magnetic recording medium; and a recording control circuit that controls write operations that the thermally-assisted magnetic recording head performs to the at least one magnetic recording medium, the recording control circuit further including a light-emission control circuit that controls light-emission operations of the light source.

18. The magnetic recording apparatus as claimed in claim 17, wherein the thermally-assisted magnetic recording head further comprises: a light detector that measures an output power of the light source in order to adjust the output power; and at least one detective light-path changer that directs a part of light propagating between the light-emitting surface of the light source and the diffraction optical element toward the light detector, and wherein the light-emission control circuit controls the light-emission operations of the light source by using an output of the light detector.

19. The magnetic recording apparatus as claimed in claim 18, wherein the light source and the light detector provided on an overcoat layer formed on the element-integration surface of the substrate.

20. A head gimbal assembly comprising the thermally-assisted magnetic recording head as claimed in claim 5 and a suspension that supports the thermally-assisted magnetic recording head.

21. A magnetic recording apparatus comprising: at least one head gimbal assembly comprising the thermally-assisted magnetic recording head as claimed in claim 5 and a suspension that supports the thermally-assisted magnetic recording head; at least one magnetic recording medium; and a recording control circuit that controls write operations that the thermally-assisted magnetic recording head performs to the at least on magnetic recording medium, the recording control circuit further including a light-emission control circuit that controls light-emission operations of the light source.

22. The magnetic recording apparatus as claimed in claim 21, wherein the thermally-assisted magnetic recording head further comprises: a light detector that measures an output power of the light source in order to adjust the output power; and at least one detective light-path changer that directs a part of light propagating between the light-emitting surface of the light source and the diffraction optical element toward the light detector, and wherein the light-emission control circuit controls the light-emission operations of the light source by using an output of the light detector.

23. The magnetic recording apparatus as claimed in claim 22, wherein the light source and the light detector are provided on an overcoat layer formed on the element-integration surface of the substrate.

* * * * *